(12) United States Patent
Yang

(10) Patent No.: US 12,549,987 B2
(45) Date of Patent: Feb. 10, 2026

(54) MEASUREMENT METHOD, SENDING METHOD, AND RELATED DEVICE

(71) Applicant: VIVO MOBILE COMMUNICATION CO., LTD., Guangdong (CN)

(72) Inventor: Yu Yang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 364 days.

(21) Appl. No.: 18/122,258

(22) Filed: Mar. 16, 2023

(65) Prior Publication Data

US 2023/0232267 A1    Jul. 20, 2023

Related U.S. Application Data

(63) Continuation of application No. PCT/CN2021/118468, filed on Sep. 15, 2021.

(30) Foreign Application Priority Data

Sep. 18, 2020  (CN) .................. 202010987816.3

(51) Int. Cl.
*H04W 24/10* (2009.01)
*H04L 5/00* (2006.01)
*H04W 48/16* (2009.01)

(52) U.S. Cl.
CPC .......... *H04W 24/10* (2013.01); *H04L 5/0048* (2013.01); *H04L 5/0057* (2013.01); *H04W 48/16* (2013.01)

(58) Field of Classification Search
CPC ....... H04B 7/063; H04B 7/024; H04L 5/0048; H04L 5/0007; H04L 5/0051; H04W 52/14; H04W 52/24; H04W 52/36
See application file for complete search history.

(56) References Cited

U.S. PATENT DOCUMENTS

| 12,127,010 | B2 * | 10/2024 | He ..................... H04L 5/0051 |
| 2017/0202014 | A1 | 7/2017 | Moon et al. |
| 2019/0165846 | A1 | 5/2019 | Kim et al. |
| 2020/0053791 | A1 | 2/2020 | Ozturk et al. |
| 2020/0366350 | A1 | 11/2020 | Hao et al. |

(Continued)

FOREIGN PATENT DOCUMENTS

| CN | 102215182 A | 10/2011 |
| CN | 106664192 A | 5/2017 |

(Continued)

OTHER PUBLICATIONS

ZTE, "Enhancements on multi-beam operation", 3GPP TSG RAN WG1 Meeting #97, Reno, US, May 13-17, 2019, R1-1906237.

(Continued)

*Primary Examiner* — Iqbal Zaidi
(74) *Attorney, Agent, or Firm* — The Webb Law Firm

(57) ABSTRACT

A measurement method includes obtaining first parameter information corresponding to a first target RS. The first target RS includes at least one of a first RS or a second RS. The first RS is used for channel measurement, the second RS is used for interference measurement. The first RS is associated with the second RS, and the first RS and the second RS are corresponding to different first information; and measuring the second RS according to the first parameter information corresponding to the first target RS.

19 Claims, 4 Drawing Sheets

(56) References Cited

U.S. PATENT DOCUMENTS

| | | | |
|---|---|---|---|
| 2021/0119680 A1 | 4/2021 | Matsumura et al. | |
| 2021/0185690 A1* | 6/2021 | Chen | H04W 72/0453 |
| 2021/0336712 A1 | 10/2021 | Yang et al. | |
| 2021/0337415 A1 | 10/2021 | Chen et al. | |
| 2022/0029692 A1 | 1/2022 | Yang et al. | |
| 2022/0394696 A1* | 12/2022 | Liu | H04L 5/0051 |

FOREIGN PATENT DOCUMENTS

| | | |
|---|---|---|
| CN | 111106916 A | 5/2020 |
| CN | 111357316 A | 6/2020 |
| CN | 111615195 A | 9/2020 |
| JP | 2022517205 A | 3/2022 |
| WO | 2019239583 A1 | 12/2019 |
| WO | 2020034312 A1 | 2/2020 |
| WO | 2020088097 A1 | 5/2020 |

OTHER PUBLICATIONS

ZTE, "Enhancements on multi-beam operation", 3GPP TSG RAN WG1 Meeting #98bis, Oct. 14-20, 2019, R1-1910285, Chongqing, China.

* cited by examiner

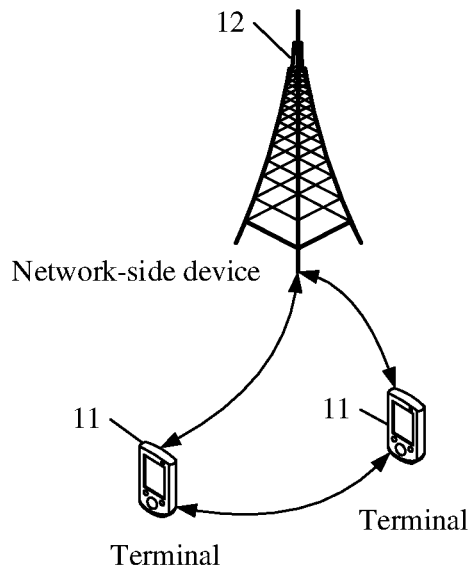

FIG. 1

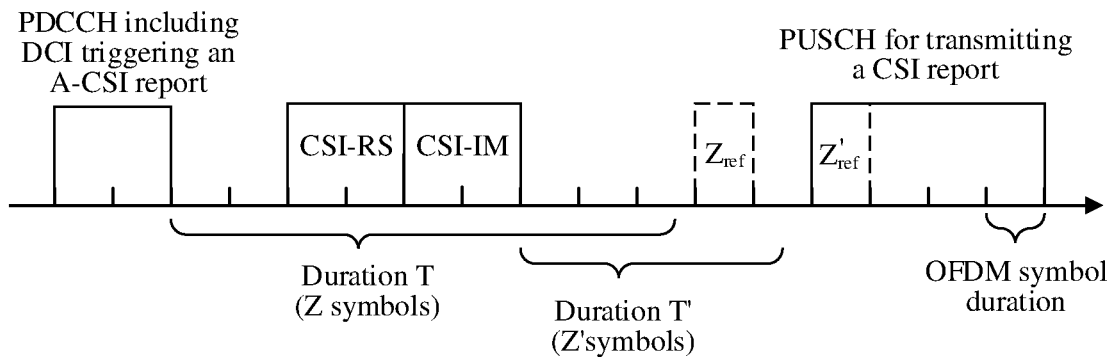

FIG. 2

| Obtain first parameter information corresponding to a first target reference signal RS, where the first target RS includes at least one of a first RS and a second RS, the first RS is used for channel measurement, the second RS is used for interference measurement, the first RS is associated with the second RS, and the first RS and the second RS are corresponding to different first information | ← 301 |
|---|---|
| Measure the second RS according to the first parameter information corresponding to the first target RS | ← 302 |

FIG. 3

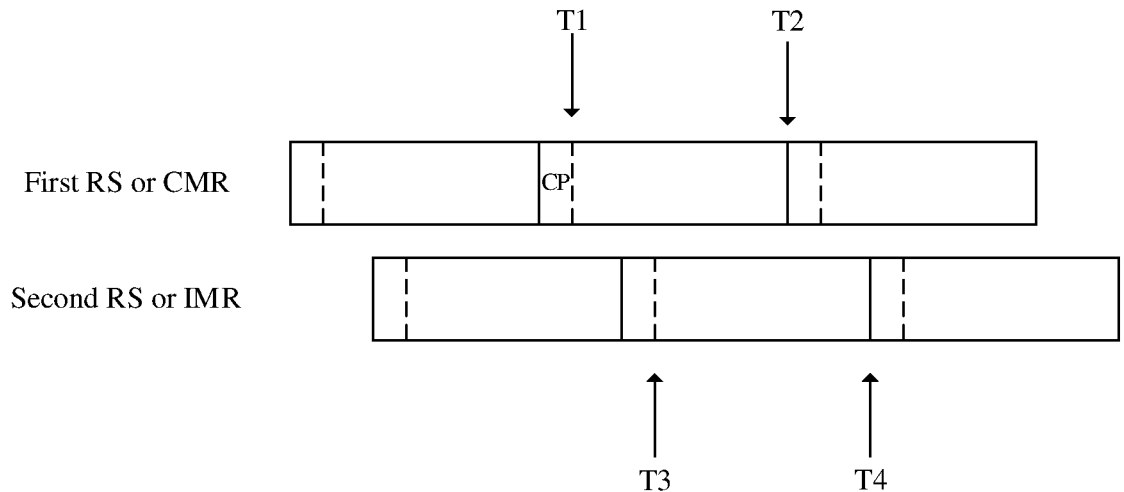

FIG. 4

```
┌─────────────────────────────────────────────────────────────────┐
│ Obtain first parameter information corresponding to a first target reference │
│ signal RS, where the first target RS includes at least one of a first RS and a │──  501
│ second RS, the first RS is used for channel measurement, the second RS is │
│ used for interference measurement, the first RS is associated with the │
│ second RS, and the first RS and the second RS are corresponding to │
│ different first information │
└─────────────────────────────────────────────────────────────────┘
                                    ↓
┌─────────────────────────────────────────────────────────────────┐
│ Send the second RS according to the first parameter information │── 502
│ corresponding to the first target RS │
└─────────────────────────────────────────────────────────────────┘
```

FIG. 5

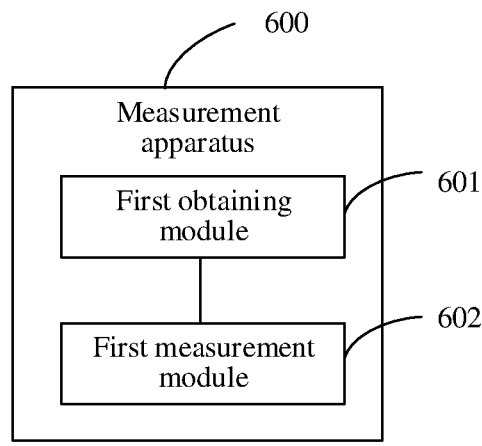

FIG. 6

MEASUREMENT METHOD, SENDING METHOD, AND RELATED DEVICE

CROSS-REFERENCE TO RELATED APPLICATIONS

This application is a Bypass Continuation Application of PCT/CN2021/118468 filed Sep. 15, 2021, and claims priority to Chinese Patent Application No. 202010987816.3 filed Sep. 18, 2020, the disclosures of which are hereby incorporated by reference in their entireties.

BACKGROUND OF THE INVENTION

Field of the Invention

This disclosure belongs to the field of communications technologies, and specifically relates to a measurement method, a sending method, and a related device.

Description of Related Art

In a multi-cell scenario, different signal transmission paths between a network node of each cell and a terminal lead to different signal transmission time between different cells and a UE.

Currently, in a case that a reference signal resource used for channel measurement (Channel Measurement Resource (or Resource for Channel Measurement), CMR) and a reference signal resource used for interference measurement (Interference Measurement Resource (or Resource for Interference Measurement), IMR) are corresponding to different cells, there is no related solution about how to implement measurement on the IMR.

SUMMARY OF THE INVENTION

Embodiments of this disclosure provide a measurement method, a sending method, and a related device.

According to a first aspect, a measurement method is provided, where the method is performed by a terminal, and the method includes:

obtaining first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information; and measuring the second RS according to the first parameter information corresponding to the first target RS.

According to a second aspect, a sending method is provided, where the method is performed by a network-side device, and the method includes:

obtaining first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information; and sending the second RS according to the first parameter information corresponding to the first target RS.

According to a third aspect, a measurement apparatus is provided, where the measurement apparatus includes:

a first obtaining module, configured to obtain first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information; and a first measurement module, configured to measure the second RS according to the first parameter information corresponding to the first target RS.

According to a fourth aspect, a sending apparatus is provided, where the sending apparatus includes:

a second obtaining module, configured to obtain first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information; and a first sending module, configured to send the second RS according to the first parameter information corresponding to the first target RS.

According to a fifth aspect, a terminal is provided, where the terminal includes a processor, a memory, and a program or instructions that are stored in the memory and executable on the processor, where the program or instructions are executed by the processor to implement the steps of the method in the first aspect.

According to a sixth aspect, a network-side device is provided, where the network-side device includes a processor, a memory, and a program or instructions that are stored in the memory and executable on the processor, where the program or instructions are executed by the processor to implement the steps of the method in the third aspect.

According to a seventh aspect, a non-transitory readable storage medium is provided, storing a program or an instruction, where the program or instruction, when executed by a processor, implements the steps of the method according to the first aspect, or implements the steps of the method according to the second aspect.

According to an eighth aspect, a chip is provided, including a processor and a communication interface, where the communication interface is coupled to the processor, and the processor is configured to run a program or an instruction on a network-side device to implement the method according to the first aspect, or implement the method according to the second aspect.

BRIEF DESCRIPTION OF THE DRAWINGS

FIG. 1 is a block diagram of a wireless communication system applicable to an embodiment of this disclosure;

FIG. 2 is a schematic diagram of a trigger time sequence of an aperiodic CSI report according to an embodiment of this disclosure;

FIG. 3 is a flowchart of a measurement method according to an embodiment of this disclosure;

FIG. 4 is a schematic diagram of RS measurement according to an embodiment of this disclosure;

FIG. 5 is a flowchart of a sending method according to an embodiment of this disclosure;

FIG. 6 is a structural diagram of a measurement apparatus according to an embodiment of this disclosure;

DESCRIPTION OF THE INVENTION

Figure 7:
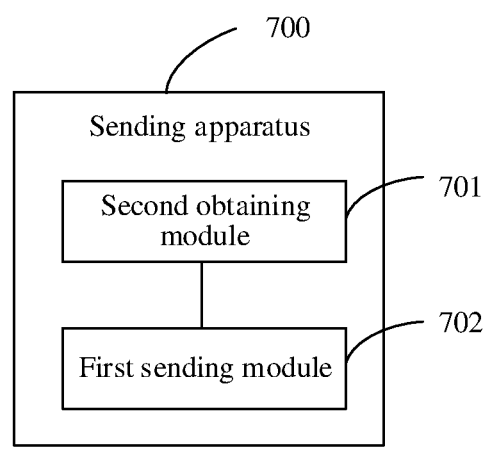
FIG. 7 is a structural diagram of a sending apparatus according to an embodiment of this disclosure.

The technical solutions in the embodiments of this disclosure are clearly described below with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure shall fall within the protection scope of this disclosure.

The specification and claims of this disclosure, and terms "first" and "second" are used to distinguish similar objects, but are unnecessarily used to describe a specific sequence or order. It may be understood that the data used in such a way is interchangeable in proper circumstances, so that the embodiments of this disclosure can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "/" generally indicates an "or" relationship between associated objects.

It should be noted that, the technology described in this embodiment of this disclosure is not limited to a long term evolution (LTE)/LTE evolution (LTE-A) system, but may further be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in this embodiment of this disclosure are often used interchangeably, and the described technologies may be used both for the systems and radio technologies mentioned above and may also be used for other systems and radio technologies. The following descriptions describe a new radio (NR) system for the objective of being used as an example, and NR terms are used in most of the descriptions below. However, these technologies may also be applied to applications other than NR system applications, such as a 6-th generation (6G) communication system.

FIG. 1 is a block diagram of a wireless communication system applicable to an embodiment of this disclosure. The wireless communication system includes a terminal 11 and a network-side device 12. The terminal 11 may also be referred to as a terminal device or a user equipment (UE). The terminal 11 may be a terminal device such as a mobile phone, a tablet computer, a laptop computer, a personal digital assistant (PDA), a palmtop computer, a netbook, an ultra-mobile personal computer (UMPC), a mobile Internet device (MID), a wearable device, or a vehicle user equipment (VUE), or a pedestrian user equipment (PUE). The wearable device includes: a band, a headset, glasses, and the like. It should be noted that a specific type of the terminal 11 is not limited in this embodiment of this disclosure. The network-side device 12 may be a base station or a core network. The base station may be referred to as a Node B, an evolved Node B, an access point, a base transceiver station (BTS), a radio base station, a radio transceiver, a basic service set (BSS), an extended service set (ESS), a Node B, an evolved Node B (eNB), a home Node B, a home evolved Node B, a WLAN access point, a Wi-Fi node, a transmitting receiving point (TRP), or another suitable term in the field. Provided that a same technical effect is achieved, the base station is not limited to a specific technical term.

For ease of understanding, the following describes some content related to the embodiments of the present disclosure.

I. Beam Measurement and Beam Reporting.

Analog beamforming is transmitted in full bandwidth, and each polarization direction array element on a panel of each high-frequency antenna array can only send an analog beam in a time division multiplexing manner. A forming weight of the analog beam may be implemented by adjusting a parameter of a device such as a radio frequency front-end phase shifter.

Training of an analog beamforming vector may be performed in a polling manner. That is, array elements in each polarization direction of each antenna panel sequentially send training signals (that is, candidate beamforming vectors) at specified time in a time division multiplexing manner. After measurement, a terminal feeds back a beam report, so that a network (that is, a network-side device) implements analog beam transmission by using the training signals when a service is transmitted next time. Content of the beam report generally includes several optimal transmit beam identifiers and measured receive power of a beam link on which each transmit beam is located.

During beam measurement, the network configures a reference signal resource set (RS resource set), including at least one reference signal resource (RS resource), such as a synchronization signal/physical broadcast channel block (SS/PBCH block, SSB) resource or a channel state information reference signal (CSI-RS) resource. UE measures a layer 1 (L1) reference signal received power (RSRP) or a L1-signal to interference plus noise ratio (SINR) of each RS resource, and reports at least one optimal measurement result to the network. The reported content includes a synchronization signal block resource indicator (SSBRI) or a channel state information reference signal resource indicator (CRI), and the L1-RSRP or the L1-SINR. The content of the report reflects at least one optimal beam and its quality for the network to determine a beam used to send a channel or a signal to the UE.

II. L1-SINR

In beam measurement, a parameter commonly used to measure beam quality is L1-RSRP. To improve accuracy of beam measurement and selection, especially in a multi-cell, multi-user, multi-beam scenario, a new parameter L1-SINR is introduced.

When configuring a CSI-report configuration (ReportConfig), the network configures a higher layer parameter "report quantity (reportQuantity)" as cri-SINR or ssb-index (Index)-SINR, that is, indicates the UE to measure and report the L1-SINR of the beam.

The network is allowed to configure, for the UE, reporting of a maximum of N SSBRI/CRI and corresponding L1-SINR values in one beam reporting instance. N is configured by using radio resource control (RRC) signaling, and candidate values are {1, 2, 3, 4}.

A base station is allowed to configure an L1-SINR-based beam report (L1-SINR based beam report) as non-group based beam reporting and group based beam reporting.

When only one resource setting is configured for the network, the resource setting is indicated by a higher layer parameter "channel measurement resource (resourcesForChannelMeasurement)", both channel measurement and interference measurement use non-zero power (NZP) CSI-RS in the resource setting, an NZP CSI-RS resource is 1-port, and density is 3 resource elements (RE) s/resource block (RB).

When two resource settings are configured on the network, the first resource setting is indicated by a higher layer parameter "resourcesForChannelMeasurement", and channel measurement uses an SSB or an NZP CSI-RS in the resource setting. The second resource setting is indicated by a higher layer parameter "interference channel state information interference measurement resource (csi-IM-ResourcesForInterference)" or "interference non-zero power channel state information reference signal resource (nzp-CSI-RS-ResourcesForInterference)", where interference measurement uses the channel state information interference measurement (CSI-IM) or NZP CSI-RS in the resource setting, and the NZP CSI-RS resource is 1-port and density is 3 REs/RB.

Each SSB or NZP CSI-RS resource used for channel measurement is associated with one CSI-IM resource or NZP CSI-RS resource used for interference measurement. An association relationship is based on ranking of RS resources in a channel measurement resource set and ranking of RS resources in an interference measurement resource set. Quantities of RS resources in the two resource sets are equal.

The UE uses a quasi co-location (QCL)-type D RS of the SSB or NZP CSI-RS resource used for channel measurement as a reference RS to determine a QCL-TypeD hypothesis of an associated CSI-IM resource or NZP CSI-RS resource used for interference measurement.

The UE may expect that the NZP CSI-RS resource set for channel measurement and the NZP CSI-RS resource set for interference measurement are configured with a higher layer parameter repetition.

For L1-SINR measurement with dedicated interference measurement resources, a UE assumes: the total received power on dedicated NZP CSI-RS resource for interference measurement [and/] or dedicated CSI-IM resource for interference measurement corresponds to interference and noise (For L1-SINR measurement with dedicated interference measurement resources, a UE assumes: the total received power on dedicated NZP CSI-RS resource for interference measurement [and/] or dedicated CSI-IM resource for interference measurement corresponds to interference and noise).

If the UE is configured with the higher layer parameter groupBasedBeamReporting set to 'disabled', the UE shall report in a single report nrofReportedRSForSINR (higher layer configured) different CRI or SSBRI for each report setting (if the UE is configured with the higher layer parameter groupBasedBeamReporting set to 'disabled', the UE shall report in a single report nrofReportedRSForSINR (higher layer configured) different CRI or SSBRI for each report setting).

If the UE is configured with the higher layer parameter groupBasedBeamReporting set to 'enabled', the UE shall report in a single reporting instance two different CRI or SSBRI for each report setting, where CSI-RS and/or SSB resources can be received simultaneously by the UE (if the UE is configured with the higher layer parameter groupBasedBeamReporting set to 'enabled', the UE shall report in a single reporting instance two different CRI or SSBRI for each report setting, where CSI-RS and/or SSB resources can be received simultaneously by the UE).

For channel measurement, the UE may be configured with CSI-RS resource setting with up to 16 resource sets, with a total of up to 64 CSI-RS resources or up to 64 SS/PBCH Block resources (for channel measurement, the UE may be configured with CSI-RS resource setting with up to 16 resource sets, with a total of up to 64 CSI-RS resources or up to 64 SS/PBCH Block resources).

When a gNB configures the UE to report SSBRI/CRI and a corresponding L1-SINR, a report format of a differential SINR is used, where SINR #1 is a largest SINR in reported SINRs, and differential SINR #N is determined according to a difference between a measured SINR corresponding to CRI/SSBRI #N and a measured SINR corresponding to CRI/SSBRI #1.

When a CSI report is configured with a reportQuantity to be "ssb-Index-SINR" or "cri-SINR", a quantity of CSI processing units (CPU) is 1.

A time requirement of the L1-SINR is $Z=Z_1$ and $Z'=Z_1'$. The detailed description is as follows:

When a CSI request field in downlink control information (DCI) triggers one or more CSI reports transmitted on a physical uplink shared channel (PUSCH), the UE needs to provide valid CSI reports when the following condition is met:

If a first uplink symbol for transmitting the CSI report after considering a timing advance is not earlier than symbol $Z_{ref}$ and not earlier than $Z'_{ref}$, where:

$Z_{ref}$ is defined as a next uplink symbol of a start moment of a cyclic prefix (CP) $T=(Z)(2048+144)\kappa 2^{-\mu}T_c$ (seconds) after the last symbol of a PDCCH of the CSI report is triggered.

When a triggered CSI report is a CSI report based on an aperiodic CSI-RS, $Z'_{ref}$ is defined as a next uplink symbol of a start moment of a CP $T'=(Z')(2048+144)\kappa 2^{-\mu}T_c$ (seconds) after the last symbol of: (1) an aperiodic CSI-RS for channel measurement; (2) aperiodic CSI-IM for interference measurement; (3) an aperiodic NZP CSI-RS for interference measurement of.

Z and Z' are defined as:

$$Z = \max_{m=0, \ldots, M-1}(Z(m));$$

$$Z' = \max_{m=0, \ldots, M-1}(Z'(m)).$$

M is a quantity of updated CSI reports, and (Z(m), Z'(m)) corresponds to a CSI computation delay corresponding to an mth updated CSI report.

For a schematic diagram of a trigger time sequence of an aperiodic CSI report, refer to FIG. 2. As shown in FIG. 2, Z includes all orthogonal frequency division multiplexing (OFDM) symbols included in duration T, and Z' includes all OFDM symbols included in duration T'.

A start moment of the duration T is a next OFDM symbol of the last OFDM symbol of a PDCCH that triggers the CSI report, and an end moment is an OFDM symbol in which $Z_{ref}$ is located. A start moment of the duration T' is a next OFDM symbol of the last OFDM symbol of CSI-IM, and an end moment is an OFDM symbol in which $Z'_{ref}$ is located.

Table 1 shows a CSI computation delay requirement.

TABLE 1

| | CSI computation delay requirement | | | | | |
|---|---|---|---|---|---|---|
| | $Z_1$ [symbols] | | $Z_2$ [symbols] | | $Z_3$ [symbols] | |
| μ | $Z_1$ | $Z_1'$ | $Z_2$ | $Z_2'$ | $Z_3$ | $Z_3'$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2$ + $KB_1$) | $X_2$ |
| 3 | 97 | 85 | 152 | 140 | min(97, $X_3$ + $KB_2$) | $X_3$ |

($Z_1$, $Z_1'$) in Table 1 meets: if the CSI to be transmitted corresponds to wideband frequency-granularity where the reportQuantity is set to 'ssb-Index-SINR', or reportQuantity is set to 'cri-SINR' (if the CSI to be transmitted corresponds to wideband frequency-granularity where the reportQuantity is set to 'ssb-Index-SINR', or reportQuantity is set to 'cri-SINR'), μ corresponds to the min (μPDCCH, μCSI-RS, μUL) where the μPDCCH corresponds to the subcarrier spacing of the PDCCH with which the DCI was transmitted and μUL corresponds to the subcarrier spacing of the PUSCH with which the CSI report is to be transmitted and μCSI-RS corresponds to the minimum subcarrier spacing of the aperiodic CSI-RS triggered by the DCI (μ corresponds to the min (μPDCCH, μCSI-RS, μUL) where the μPDCCH corresponds to the subcarrier spacing of the PDCCH with which the DCI was transmitted and μUL corresponds to the subcarrier spacing of the PUSCH with which the CSI report is to be transmitted and μCSI-RS corresponds to the minimum subcarrier spacing of the aperiodic CSI-RS triggered by the DCI).

It should be noted that, in the embodiments of this disclosure, the mentioned QCL information includes at least one of first-type QCL information and second-type QCL information, the first-type (Type) QCL information is beam information, or the second-type QCL information includes at least one of time domain information or frequency domain information. The first-type QCL information may include QCL-Type D information, and the second-type QCL information may include at least one of QCL-TypeA information, QCL-Type B information, or QCL-Type C information.

The mentioned beam information may also be referred to as spatial relation information, spatial domain transmission filter information, spatial filter information, transmission configuration indicator (TCI) state information, first-type QCL information, a QCL parameter, or the like. Downlink beam information may generally be represented by using TCI state information or first-type QCL information. Uplink beam information may be generally represented by using spatial relation information.

The mentioned antenna panel may also be referred to as an antenna group, an antenna port group, an antenna set, an antenna port set, a beam set, a beam sub-set, an antenna array, an antenna port array, an antenna sub-array, an antenna port sub-array, a logical entity, an entity, an antenna entity, or the like.

An identifier of a panel may be an identifier of an antenna panel, a reference signal resource identifier, a reference signal resource set identifier, a TCI state identifier, a beam information identifier, a spatial relation identifier, or the like.

A first RS may be the foregoing CMR. The CMR in the protocol may be correspondingly an RS resource indicated by a higher layer parameter "resourcesForChannelMeasurement", for example, a non-zero power (NZP) CSI-RS resource.

A second RS may be the foregoing IMR. The IMR in the protocol may be correspondingly a CSI-IM resource indicated by a higher layer parameter "csi-IM-ResourcesForInterference", or may be referred to as a zero power (ZP) IMR. Alternatively, the IMR in the protocol may be correspondingly an NZP CSI-RS resource indicated by a higher layer parameter "nzp-CSI-RS-ResourcesForInterference", or may be referred to as an NZP IMR.

The mentioned object may be a cell, a physical cell, a TRP, or a beam.

The mentioned local cell of the terminal may also be referred to as a serving cell of the terminal, a current cell of the terminal, a current serving cell of the terminal, a primary cell of the terminal, or the like.

The mentioned neighboring cell of the terminal may also be referred to as a non-serving cell of the terminal, a non-local cell of the terminal, a non-current cell of the terminal, a non-current serving cell of the terminal, or a secondary cell of the terminal.

The mentioned measuring the RS may also be referred to as receiving the RS.

FIG. 3 is a flowchart of a measurement method according to an embodiment of this disclosure. The measurement method in this embodiment of this disclosure may be performed by a terminal.

As shown in FIG. 3, the measurement method may include the following steps:

Step 301: Obtain first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information.

In this embodiment of this disclosure, that the first RS and the second RS are corresponding to different first information may reflect different transmission paths of the first RS and the second RS from a network-side device to the terminal, different beam information of the first RS and the second RS, and the like.

Optionally, the first information may include at least one of the following: cell identity information. physical cell identifier (PCI) information, transmitting receiving point TRP identity information, frequency information, subcarrier spacing (SCS) information, numerology information, timing advance (TA) information, or QCL information.

In some embodiments, the cell identity information may be a cell index or a cell identity (cell ID). The TRP identifier information may be a TRP identifier (TRP ID) or a higher layer parameter "control resource pool index (CORESET-PoolIndex)".

The first parameter information corresponding to the first target RS may be all or a part of parameter information corresponding to the first target RS.

Optionally, the first parameter information may include at least one of timing information or quasi co-location QCL information; and the QCL information includes at least one of first-type QCL information or second-type QCL information, the first-type QCL information is beam information, and the second-type QCL information includes at least one of time domain information or frequency domain information.

Optionally, in a case that the first parameter information includes timing information, the first parameter information corresponding to the first target RS may be understood as any one of the following:

timing information associated with a first object, where the first object is an object in which the first target RS is located;

timing information associated with first information corresponding to the first target RS; and timing information associated with a second object, where the second object is an object associated with the first information corresponding to the first target RS;

where the object is a cell, a physical cell, a transmitting receiving point TRP, or a beam.

It may be understood that, in a case that the first target RS includes the first RS and the second RS, specific representation forms of the first parameter information corresponding to the first RS and second parameter information corresponding to the second RS are the same. For example, in a case that the first parameter information corresponding to the first RS includes timing information, the first parameter information corresponding to the second RS includes timing information.

Step 302: Measure the second RS according to the first parameter information corresponding to the first target RS.

In this embodiment of this disclosure, in a first manner, the terminal may directly measure the second RS according to the first parameter information corresponding to the first target RS.

In a second manner, the terminal may indirectly measure the second RS according to the first parameter information corresponding to the first target RS. Optionally, the terminal may measure the second RS according to second parameter information determined based on the first parameter information corresponding to the first target RS.

In actual application, the first manner may be applied to a first scenario, and the second manner may be applied to a second scenario. This disclosure is not limited thereto. The first scenario is a scenario in which the network-side device does not adjust time for sending the second RS, and because the first RS and the second RS arrive at the terminal on different paths, the first RS and the second RS arrive at the terminal at different time. The second scenario may be a scenario in which the network-side device adjusts the time for sending the second RS, so that the first RS and the second RS arrive at the terminal at similar time to or even the same time. In some embodiments, the network-side device may adjust the time for sending the second RS by advancing or delaying the time for sending the second RS. This is specifically determined according to an actual situation, which is not limited in this embodiment of this disclosure.

According to the measurement method in this embodiment of this disclosure, for a first RS used for channel measurement and a second RS used for interference measurement that have an association relationship, in a case that the first RS and the second RS are corresponding to different first information, a terminal may measure the second RS according to the first parameter information corresponding to the first RS and/or the second RS, thereby resolving a measurement problem of the second RS in a case that the first RS and the second RS are corresponding to different first information.

1. The following describes "the first RS and the second RS are corresponding to different first information" in this embodiment of this disclosure.

Optionally, that the first RS and the second RS are corresponding to different first information may be represented as follows:

target information associated with the first RS and the second RS is corresponding to different first information; and the target information includes at least one of the following: QCL information; resource setting information; second information of resource setting information; or a source RS of QCL information;

where the second information is timing information or a parameter indicating timing information.

The description is as follows:

1) QCL information associated with the first RS and the second RS includes different first information.

For example, a parameter TCI-State or QCL-Info associated with the first RS includes PCI1. Parameter TCI-State or QCL-Info associated with the second RS includes PCI2.

2) Resource setting information associated with the first RS and the second RS includes different first information.

In some embodiments, the first information may be placed in each layer information in the resource setting information associated with the RS. For example, if the resource setting information (for example, resource setting or CSI-ResourceConfig) of the RS may include NZP-CSI-RS-ResourceSet, and the NZP-CSI-RS-ResourceSet may include NZP-CSI-RS-Resource, the first information may be placed in CSI-ResourceConfig, NZP-CSI-RS-ResourceSet, or NZP-CSI-RS-Resource of the RS. The description is as follows:

In a first implementation, CSI-ResourceConfig associated with the first RS and the second RS includes different first information. For example, CSI-ResourceConfig of the first RS includes PCI1, and CSI-ResourceConfig of the first RS includes PCI2.

In a second implementation, NZP-CSI-RS-ResourceSets associated with the first RS and the second RS include different first information. For example, NZP-CSI-RS-ResourceSet of the first RS includes PCI1, and NZP-CSI-RS-ResourceSet of the second RS includes PCI2.

In a third implementation, NZP-CSI-RS-Resources associated with the first RS and the second RS include different first information. For example, NZP-CSI-RS-Resource of the first RS includes PCI1, and NZP-CSI-RS-Resource of the second RS includes PCI2.

3) Second information of resource setting information associated with the first RS and the second RS is corresponding to different first information, and the second information is timing information or a parameter indicating timing information.

In some embodiments, the resource setting information associated with the first RS and the second RS may include different second information corresponding to different first information.

For example, a resource setting of the first RS includes a parameter 1, and the parameter 1 indicates timing information 1. A resource setting of the second RS includes a parameter 2, where the parameter 2 indicates timing information 2, the timing information 1 corresponds to PCI1, and the timing information 2 corresponds to PCI2.

In this way, the terminal may learn, by using the second information included in the resource setting information associated with the first RS and the second RS, that the first RS and the second RS are corresponding to different first information.

It may be understood that, for a placement location of the second information in the resource setting information, refer to the placement location of the first information in the resource setting information. Specifically, the placement location may be determined according to an actual situation. This is not limited in this embodiment of this disclosure.

4) Source RSs of QCL information associated with the first RS and the second RS are corresponding to different first information.

For example, a QCL Source RS associated with the first RS is SSB1/TRS1; and a QCL Source RS associated with the second RS is SSB2/TRS2, where SSB1/TRS1 corresponds to PCI1, and SSB2/TRS2 corresponds to PCI2.

In some embodiments, the first information corresponding to the first RS and the second RS may be configured by the network-side device. Optionally, before the measuring the second RS according to the first parameter information corresponding to the first target RS, the method further includes:

receiving configuration information, where the configuration information is used to indicate the terminal to measure and report a layer-1 signal to interference plus noise ratio L1-SINR, the configuration information is configured with the first information corresponding to the first RS and the second RS, and the first information corresponding to the first RS and the second RS is different.

In this optional implementation, during implementation, an L1-SINR report indicated by the configuration information may be an inter-cell, inter-physical cell, or inter-TRP L1-SINR report.

The configuration information may include a first resource setting related to the first RS and a second resource setting related to the second RS. A first RS configured by the first resource setting and a second RS configured by the second resource setting have an association relationship, and at least one first RS and a second RS associated with the first RS are corresponding to different first information.

2. The following describes "measuring the second RS according to the first parameter information corresponding to the first target RS" in this embodiment of this disclosure.

It may be learned from the foregoing content that in a first manner, the terminal may directly measure the second RS according to the first parameter information corresponding to the first target RS. In a second manner, the terminal may indirectly measure the second RS according to the first parameter information corresponding to the first target RS. The following describes specific implementations of the first manner and the second manner.

For the first manner, in a specific implementation, the following implementations may be included:

In a first implementation, the terminal may directly measure the second RS according to the first parameter information corresponding to the first RS, to obtain an interference measurement result of the second RS.

In a second implementation, the terminal may directly measure the second RS according to the first parameter information corresponding to the second RS, to obtain an interference measurement result of the second RS.

In a third implementation, the terminal may directly measure the second RS according to the first parameter information corresponding to the first RS and the first parameter information corresponding to the second RS, to obtain an interference measurement result of the second RS.

For ease of understanding, an example is described as follows:

It is assumed that the first RS is sent to the terminal by TRP1, and the second RS is sent to the terminal by TRP2. TRP1 corresponds to PCI1, and TRP2 corresponds to PCI2. Because transmission paths between TRP1 and TRP2 and the terminal are different, timing information corresponding to the first RS and the second RS are different.

As shown in FIG. 4, it is assumed that time points at which the terminal receives a head symbol and a tail symbol of an ith first RS are respectively T1 and T2, and time points at which the terminal receives a head symbol and a tail symbol of an ith second RS are respectively T3 and T4, where T3 is between T1 and T2, and T4 is after T2. The ith second RS arrives at the terminal later than the ith first RS.

In the foregoing first implementation, the terminal may measure the symbol of the ith second RS by using a first Fast Fourier Transform (FFT) window, where the first FFT window is an FFT window used to measure the symbol of the ith first RS. In this case, the terminal may detect, in the first FFT window, some symbols of the ith second RS between T3 and T2, or detect, in the first FFT window, some symbols of an (i−1)th second RS falling into the first FFT window and some symbols of the ith second RS falling into the first FFT window.

For the foregoing second implementation, the terminal may measure the ith second RS by using a second FFT window, where the second FFT window is an FFT window used to measure the symbol of the ith second RS. In this case, the terminal may detect a complete ith second RS in the second FFT window, that is, may detect all symbols of the ith second RS.

For the foregoing third implementation, the terminal may measure the ith second RS by using the first FFT window and the second FFT window.

For the foregoing second manner, optionally, the measuring the second RS according to the first parameter information corresponding to the first target RS includes:

obtaining second parameter information, where the second parameter information is determined based on the first parameter information corresponding to the first target RS; and measuring the second RS according to the second parameter information.

A representation form of the second parameter information is the same as a representation form of the first parameter information. For example, in a case that the first parameter information is timing information or second-type QCL information, the second parameter information is timing information or second-type QCL information.

It may be learned from the foregoing content that the second manner may be applied to a second scenario. In the second scenario, the network-side device may adjust the time for sending the second RS, so that the first RS and the second RS arrive at the terminal at similar time or even the same time. Therefore, a value of the second parameter information may be close to or equal to a value of the first parameter information corresponding to the first RS.

In a specific implementation, when the first RS and the second RS arrive at the terminal at the same time, the first parameter information corresponding to the first RS may be directly determined as second parameter information. In a case that the first RS and the second RS arrive at the terminal at similar but different time, the second parameter information may be determined based on the first parameter information corresponding to the first RS and offset parameter information, where the offset parameter information may be specified by a protocol or configured by the network-side device.

It should be noted that a manner in which the terminal obtains the second parameter information may be receiving and obtaining, for example, after obtaining the second parameter information, the network-side device may send the second parameter information to the terminal. In this case, the network-side device may obtain the second parameter information based on the first parameter information (for example, values or a difference of the first parameter information corresponding to the two RSs) reported by the terminal and/or corresponding to the second RS. In this way, a running burden of the terminal can be reduced.

Certainly, in another implementation, the terminal may also obtain the second parameter information by processing the first parameter information corresponding to the first target RS. For example, the terminal learns, by means of measurement or the like, the first parameter information corresponding to the first RS and/or the second RS, and determines the second parameter information based on a manner agreed in advance with the network-side device. In this way, the network-side device does not need to send the second parameter information to the terminal, thereby reducing signaling overheads.

3. The following describes "obtaining first parameter information corresponding to a first target reference signal RS".

Optionally, in a case that the first target RS includes the second RS, the obtaining first parameter information corresponding to a first target reference signal RS includes any one of the following:
  determining, according to the first RS, first parameter information corresponding to the second RS; and
  in a case that a first condition is met, determining, according to the first RS, the first parameter information corresponding to the second RS.

In this optional implementation, the main difference of the two items is as follows:

In the first item, the first parameter information corresponding to the second RS is always determined based on the first RS, that is, the first parameter information corresponding to the second RS is always related to the first RS.

In the second item, only when a condition is met, the first parameter information corresponding to the second RS is determined based on the first RS. That is, when a condition is met, determining of the first parameter information corresponding to the second RS is related to the first RS. Otherwise, determining of the first parameter information corresponding to the second RS may not be related to the first RS.

For the second item, it should be noted that a condition that needs to be met when timing information corresponding to the second RS is determined based on the first RS may be the same as or different from a condition that needs to be met when QCL information corresponding to the second RS is determined based on the first RS. To distinguish between the conditions that need to be met by the two, the first condition may include a first sub-condition and a second sub-condition, the first sub-condition is corresponding to the timing information, and the second sub-condition is corresponding to the QCL information.

Optionally, in a case that the first parameter information is QCL information, that the first condition is met may include that the QCL information corresponding to the first RS is not default QCL information. That is, that the second sub-condition is meet may include: The QCL information corresponding to the first RS is not the default QCL information. However, it should be understood that a representation form that the second sub-condition is met is merely an example, and this embodiment of this disclosure does not limit specific representation forms that the first sub-condition is met and the second sub-condition is met.

It may be understood that, in another implementation, determining of the first parameter information corresponding to the second RS may always be irrelevant to the first RS.

For example, the timing information corresponding to the second RS may be obtained by means of measurement by the terminal, and the QCL information corresponding to the second RS may be configured by the network-side device.

It may be learned from the foregoing content that, in this embodiment of this disclosure, a manner of obtaining the timing information corresponding to the second RS may be any one of the following:
  a) The timing information corresponding to the second RS is determined based on the first RS;
  b) The timing information corresponding to the second RS is obtained by the terminal by means of measurement;
  c) in a case that the first sub-condition is met, the timing information corresponding to the second RS is determined based on the first RS; and
  d) in a case that the first sub-condition is not met, the timing information corresponding to the second RS is obtained by the terminal by means of measurement.

It should be noted that a) or c) may be applied to a scenario in which the terminal measures the timing information corresponding to the second RS, or may be applied to a scenario in which the terminal does not measure the timing information corresponding to the second RS. In the scenario in which the terminal measures the timing information corresponding to the second RS, the terminal may obtain the timing information corresponding to the second RS obtained by means of measurement, or may obtain the timing information corresponding to the second RS determined based on the first RS. However, when measuring the second RS, the terminal chooses to use the timing information corresponding to the second RS determined based on the first RS.

A manner of obtaining the QCL information corresponding to the second RS may be any one of the following:
  a) The QCL information corresponding to the second RS is determined based on the first RS;
  b) The QCL information corresponding to the second RS is configured by the network-side device;
  c) in a case that the second sub-condition is met, the QCL information corresponding to the second RS is determined based on the first RS; and
  d) in a case that the second sub-condition is not met, the QCL information corresponding to the second RS is configured by the network-side device.

It should be noted that, a) or c) may be applied to a scenario in which the network-side device configures the QCL information corresponding to the second RS, or may be applied to a scenario in which the network-side device does not configure the QCL information corresponding to the second RS. In the scenario in which the network-side device configures the QCL information corresponding to the second RS, the terminal may obtain the QCL information corresponding to the second RS configured by the network-side device, or may obtain the QCL information corresponding to the first RS determined based on the second RS. However, when measuring the second RS, the terminal chooses to use the QCL information corresponding to the second RS determined based on the first RS.

Optionally, in a case that the first parameter information includes timing information, the determining, according to the first RS, the first parameter information corresponding to the second RS includes:
  in this optional implementation, the terminal may measure the second RS by using the timing information corresponding to the first RS.

Optionally, in a case that the first parameter information includes QCL information, the determining, according to the first RS, the first parameter information corresponding to the second RS includes at least one of the following:

in a case that the first RS is a synchronization signal/ physical broadcast channel block SSB, determining the first RS or a first tracking reference signal TRS as QCL information corresponding to the second RS, where the first TRS is a TRS corresponding to the first RS; or in a case that the first RS is a non-zero power NZP channel state information CSI-RS, determining QCL information corresponding to the first RS as QCL information corresponding to the second RS.

It may be learned from the foregoing content that the QCL information in this embodiment of the present disclosure includes first-type QCL information and second-type QCL information. For the first-type QCL information and the second-type QCL information, in a case that the first RS is an SSB, a manner of determining the first-type QCL information may be different. A detailed description is as follows:

For the first-type QCL information, the determining the first RS or a first tracking reference signal TRS as the QCL information corresponding to the second RS may be: determining the SSB as the first-type QCL information corresponding to the second RS.

For the first-type QCL information, the determining the first RS or a first tracking reference signal TRS as the QCL information corresponding to the second RS may be: determining an SSB or a TRS associated with the SSB as the first-type QCL information corresponding to the second RS.

In this embodiment of this disclosure, the RS may be a periodic RS, an aperiodic RS, or a semi-persistent RS. The following separately describes QCL information corresponding to the aperiodic RS and the semi-persistent RS.

Optionally, in a case that the first parameter information includes QCL information, the first target RS is an aperiodic RS, and the first target RS corresponds to first information of a neighboring cell of the terminal, the obtaining first parameter information corresponding to a first target reference signal RS includes:

in a case that the first target RS is triggered by using first downlink control information DCI, determining, according to a target trigger offset value and a target preset threshold, QCL information corresponding to the first target RS;

where the target trigger offset value is a first trigger offset value or a second trigger offset value, the first trigger offset value is corresponding to a local cell of the terminal, and the second trigger offset value is corresponding to the neighboring cell of the terminal; and the target preset threshold is a first preset threshold or a second preset threshold, the first preset threshold is corresponding to the local cell of the terminal, and the second preset threshold is corresponding to the neighboring cell of the terminal.

Optionally, the determining, according to a target trigger offset value and a target preset threshold, QCL information corresponding to the first target RS includes at least one of the following:

in a case that a first value is less than a second value, the QCL information corresponding to the first target RS is default QCL information; or in a case that a first value is greater than or equal to a second value, the QCL information corresponding to the first target RS is QCL information indicated by the first DCI;

the first value and the second value meet any one of the following:

the first value is a sum of the first trigger offset value and a first offset value, and the second value is the first preset threshold;

the first value is the first trigger offset value, and the second value is a sum of the first preset threshold and a second offset value;

the first value is the first trigger offset value, and the second value is the second preset threshold;

the first value is the second trigger offset value, and the second value is the first preset threshold; and the first value is the second trigger offset value, and the second value is the second preset threshold;

where both the first offset value and the second offset value are determined based on a delay required for beam switching.

In some embodiments, the first offset value and the second offset value may be predetermined by a protocol or configured by the network-side device.

In this embodiment of this disclosure, for the RS corresponding to the first information of the neighboring cell of the terminal, a trigger offset value (equivalent to the foregoing first value) and a preset threshold (equivalent to the foregoing second value) corresponding to the RS of the first information of the neighboring cell of the terminal may be determined based on any one of the following manners:

the first trigger offset value and the first preset threshold;

the first trigger offset value and the second preset threshold;

the second trigger offset value and the first preset threshold; and the second trigger offset value and the second preset threshold.

Because the RS is corresponding to the first information of the neighboring cell of the terminal, in a case that the QCL information corresponding to the RS is based on the first trigger offset value and the first preset threshold, the first trigger offset value and/or the first preset threshold may be increased by one offset value, which is used as a trigger offset value and a preset threshold corresponding to the RS. It should be noted that when the first trigger offset value and the first preset threshold are separately increased by one offset value, offset values separately increased for the first trigger offset value and the first preset threshold may be different.

In this embodiment of this disclosure, in an optional implementation, in a case that the trigger offset value corresponding to the RS is less than the preset threshold corresponding to the RS, the terminal may receive the RS according to the default QCL information and the timing information of the local cell of the terminal.

For example, when DCI triggers an aperiodic CSI-RS of the neighboring cell, a trigger offset value between the DCI and the aperiodic CSI-RS is less than the preset threshold, and the default QCL information needs to be used.

Because time at which a signal of the neighboring cell arrives at the UE is longer than time at which a signal of the local cell arrives at the UE, for example, a timing offset exists, the aperiodic CSI-RS from the neighboring cell may be received according to the timing information of the local cell and the default QCL information.

Optionally, in a case that the first parameter information includes QCL information, the first target RS is a semi-persistent RS, and the first target RS corresponds to first information of a neighboring cell of the terminal, the obtaining first parameter information corresponding to a first target reference signal RS includes:

in a case that the first target RS is activated by using a first media access control MAC control element CE command, after a target effective time domain resource, determining that QCL information of the first target RS is valid QCL information, where the target effective time domain resource is a resource determined based on a reference effective time domain resource and a third offset value;

where the reference effective time domain resource is corresponding to a local cell of the terminal; and the third offset value is determined based on at least one of the following: a delay of sending the first MAC CE command to the terminal by a network-side device, a delay of sending acknowledgement information of the first MAC CE command to the network-side device by the terminal, a delay required for beam switching, or a delay of sending an RS to the terminal by the network-side device in the neighboring cell of the terminal.

In some embodiments, the third offset value may be preset by a protocol or configured by the network-side device.

In this optional implementation, the first MAC CE command may be a MAC CE command for activating the resource of the first target RS, or may be a MAC CE command for activating the QCL information of the first target RS. Specifically, the first MAC CE command may be determined according to an actual situation. This is not limited in this embodiment of this disclosure.

In this optional implementation, the reference effective time domain resource corresponds to the local cell of the terminal, that is, an RS corresponding to the first information of the local cell of the terminal is after the reference effective time domain resource, it may be determined that QCL information of the RS is valid QCL information. An RS corresponding to the first information of the neighboring cell of the terminal needs to be after the target effective reference time domain resource, so that it may be determined that the QCL information of the RS is valid QCL information, and the target effective time domain resource is a resource determined based on the reference effective time domain resource and the third offset value.

For ease of understanding, an example is described as follows:

It is assumed that the reference effective time domain resource is a slot 4, and the third offset value is two slots. RS1 corresponds to the first information of the local cell of the terminal, and RS2 corresponds to the first information of the neighboring cell of the terminal. Only when RS1 is after Slot4, the activated QCL information can be used. Only when RS2 is after Slot6, the activated QCL information can be used.

The following describes an object corresponding to the first RS and transmission of a channel and an RS of an object corresponding to the second RS.

Optionally, the method further includes at least one of the following:

stopping performing a sending or receiving operation of fourth information in a first time period;
performing a sending or receiving operation of fifth information in the first time period; or
performing rate matching on a physical downlink shared channel PDSCH in the first time period;
where the first time period is related to transmission time of a second target RS; the fourth information is a channel or an RS of a third object; the fifth information is a channel or an RS, in the channel or the RS of the third object, that has a QCL relationship with the second target RS; and the third object is a cell, a physical cell, a TRP, or a beam corresponding to a third target RS, the third target RS is one of the first RS and the second RS, and the second target RS is another of the first RS and the second RS.

Optionally, the first time period includes:
first transmission time and first offset time, where the first transmission time is the transmission time of the second target RS, and the first offset time includes at least one of first sub-offset time or second sub-offset time;
where the first sub-offset time is located before the first transmission time, and is consecutive with the first transmission time; and the second sub-offset time is after the first transmission time, and is consecutive with the first transmission time.

Optionally, in a case that the second target RS is the second RS, the transmission time of the second target RS is determined based on at least one of the following:
timing information corresponding to the second RS; or
timing information corresponding to the first RS.

In this optional implementation, in a case that the first time period includes transmission time of the first RS, the terminal may stop performing sending or receiving operations of all or some "channels or RSs" of the object corresponding to the second RS; or performing only a sending or receiving operation of "a channel or an RS", in the object corresponding to the second RS, that has a QCL relationship with the first RS.

Correspondingly, in a case that the first time period includes transmission time of the second RS, the terminal may stop performing sending or receiving operations of all or some "channels or RSs" of the object corresponding to the first RS; or performing only a sending or receiving operation of "a channel or an RS", in the object corresponding to the first RS, that has a QCL relationship with the second RS.

In this way, transmission interference can be reduced, and transmission efficiency can be improved.

Optionally, the method further includes at least one of the following:

stopping performing a measurement operation of sixth information in a second time period; or
performing a measurement operation of seventh information in the second time period;
where the second time period is related to transmission time of a channel or an RS of a fourth object; the sixth information is a fifth target RS; the seventh information is an RS, in the fifth target RS, that has a QCL relationship with the channel or the RS of the fourth object; and the fourth object is a cell, a physical cell, a TRP, or a beam corresponding to a fourth target RS, the fourth target RS is one of the first RS and the second RS, and the fifth target RS is the other of the first RS and the second RS.

Optionally, the second time period includes:
second transmission time and second offset time, where the second transmission time is the transmission time of the channel or the RS of the fourth object, and the second offset time includes at least one of third sub-offset time or fourth sub-offset time;
where the third sub-offset time is before the second transmission time, and is consecutive with the second transmission time; and the fourth sub-offset time is after the second transmission time, and is consecutive with the second transmission time.

In this optional implementation, in a case that the first time period includes the transmission time of the channel or the RS of the object corresponding to the first RS, the terminal may stop performing measurement operations of all or some second RSs; or perform only a measurement operation of a second RS that has a QCL relationship with the channel or the RS of the object corresponding to the first RS.

Correspondingly, in a case that the first time period includes the transmission time of the channel or the RS of the object corresponding to the second RS, the terminal may stop performing measurement operations of all or some first RSs; or perform only a measurement operation of a first RS that has a QCL relationship with the channel or the RS of the object corresponding to the second RS.

In this way, transmission interference can be reduced, and transmission efficiency can be improved.

The following describes measurement time of the second RS.

Optionally, the measuring the second RS according to the first parameter information corresponding to the first target RS includes:
 measuring the second RS during running of a CSI processing unit according to the first parameter information corresponding to the first target RS;
 where running duration of the CSI processing unit is determined based on any one of the following:
 measuring the second RS during running of a CSI processing unit according to the first parameter information corresponding to the first target RS;
 where running duration of the CSI processing unit is determined based on any one of the following:
 first $(Z_1, Z_1')$, where the first $(Z_1, Z_1')$ is any $(Z_1, Z_1')$ of T $(Z_1, Z_1')$ with a largest value in Q candidate $(Z_1, Z_1')$; and
 second $(Z_1, Z_1')$, where the second $(Z_1, Z_1')$ is determined based on third $(Z_1, Z_1')$ and a fourth offset value, and the third $(Z_1, Z_1')$ is any $(Z_1, Z_1')$ of Q candidate $(Z_1, Z_1')$;
 where T and Q are positive integers, and the fourth offset value is determined based on a delay required for beam switching.

For ease of understanding, the following example is described with reference to Table 1:

The first $(Z_1, Z_1')$ may be $(Z_1, Z_1')$ corresponding to $\mu=3$, that is, (97, 85).

The second $(Z_1, Z_1')$ may be obtained by separately increasing $(Z_1, Z_1')$ corresponding to $\mu=0$ by delta, that is, (22+delta, 16+delta).

The following describes measurement of the first RS in this embodiment of this disclosure.

Optionally, the method further includes:
 measuring the first RS according to the first parameter information corresponding to the first RS.

In this optional implementation, the terminal may measure the first RS according to the first parameter information corresponding to the first RS, to obtain a channel measurement result of the first RS; measure the second RS according to the first parameter information corresponding to the first target RS, to obtain an interference measurement result of the second RS; and then, obtain L1-SINR measurement results corresponding to the first RS and the second RS according to the channel measurement result of the first RS and the interference measurement result of the second RS.

In this way, for the first RS used for channel measurement and the second RS used for interference measurement that have an association relationship, in a case that the first RS and the second RS are corresponding to different first information, the terminal may measure the first RS according to the first parameter information corresponding to the first RS; and measure the second RS according to the first parameter information corresponding to the first RS and/or the second RS, so as to resolve a measurement problem of the first RS and the second RS in a case that the first RS and the second RS are corresponding to different first information, to obtain the L1-SINR measurement results corresponding to the first RS and the second RS.

FIG. 5 is a flowchart of a sending method according to an embodiment of this disclosure. The sending method in this embodiment of this disclosure is performed by a network-side device.

As shown in FIG. 5, the sending method may include the following steps:

Step 501: Obtain first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information.

Step 502: Send the second RS according to the first parameter information corresponding to the first target RS.

According to the sending method in this embodiment of this disclosure, for a first RS used for channel measurement and a second RS used for interference measurement that have an association relationship, in a case that the first RS and the second RS are corresponding to different first information, a network-side device may send the second RS according to the first parameter information corresponding to the first RS and/or the second RS, thereby resolving a sending problem of the second RS in a case that the first RS and the second RS are corresponding to different first information.

Optionally, the first parameter information includes at least one of timing information or quasi co-location QCL information; and
 the QCL information includes at least one of first-type QCL information or second-type QCL information, the first-type QCL information is beam information, and the second-type QCL information includes at least one of time domain information or frequency domain information.

Optionally, in a case that the first parameter information includes timing information, the first parameter information corresponding to the first target RS includes any one of the following:
 timing information associated with a first object, where the first object is an object in which the first target RS is located;
 timing information associated with first information corresponding to the first target RS; and
 timing information associated with a second object, where the second object is an object associated with the first information corresponding to the first target RS;
 where the object is a cell, a physical cell, a transmitting receiving point TRP, or a beam.

Optionally, that the first RS and the second RS are corresponding to different first information includes:
 target information associated with the first RS and the second RS is corresponding to different first information; and
 the target information includes at least one of the following: QCL information; resource setting information;

second information of resource setting information; or
a source RS of QCL information;
where the second information is timing information or a parameter indicating timing information.

Optionally, the first information includes at least one of the following: cell identity information, physical cell identifier PCI information, transmitting receiving point TRP identity information, frequency information, subcarrier spacing SCS information, numerology information, timing advance TA information, or QCL information.

Optionally, the sending the second RS according to the first parameter information corresponding to the first target RS includes:
obtaining second parameter information, where the second parameter information is determined based on the first parameter information corresponding to the first target RS; and
sending the second RS according to the second parameter information.

Optionally, in a case that the first target RS includes the second RS, the obtaining first parameter information corresponding to a first target reference signal RS includes any one of the following:
determining, according to the first RS, first parameter information corresponding to the second RS; and
in a case that a first condition is met, determining, according to the first RS, the first parameter information corresponding to the second RS.

Optionally, in a case that the first parameter information is QCL information, that the first condition is met includes that the QCL information corresponding to the first RS is not default QCL information.

Optionally, in a case that the first parameter information includes timing information, the determining, according to the first RS, the first parameter information corresponding to the second RS includes:
determining timing information corresponding to the first RS as timing information corresponding to the second RS.

Optionally, in a case that the first parameter information includes QCL information, the determining, according to the first RS, the first parameter information corresponding to the second RS includes at least one of the following:
in a case that the first RS is a synchronization signal/physical broadcast channel block SSB, determining the first RS or a first tracking reference signal TRS as QCL information corresponding to the second RS, where the first TRS is a TRS corresponding to the first RS; or
in a case that the first RS is a non-zero power NZP channel state information CSI-RS, determining QCL information corresponding to the first RS as QCL information corresponding to the second RS.

Optionally, in a case that the first parameter information includes QCL information, the first target RS is an aperiodic RS, and the first target RS corresponds to first information of a neighboring cell of the terminal, the obtaining first parameter information corresponding to a first target reference signal RS includes:
in a case that the first target RS is triggered by using first downlink control information DCI, determining, according to a target trigger offset value and a target preset threshold, QCL information corresponding to the first target RS;
where the target trigger offset value is a first trigger offset value or a second trigger offset value, the first trigger offset value is corresponding to a local cell of the terminal, and the second trigger offset value is corresponding to the neighboring cell of the terminal; and
the target preset threshold is a first preset threshold or a second preset threshold, the first preset threshold is corresponding to the local cell of the terminal, and the second preset threshold is corresponding to the neighboring cell of the terminal.

Optionally, the determining, according to a target trigger offset value and a target preset threshold, QCL information corresponding to the first target RS includes at least one of the following:
in a case that a first value is less than a second value, the QCL information corresponding to the first target RS is default QCL information; or
in a case that a first value is greater than or equal to a second value, the QCL information corresponding to the first target RS is QCL information indicated by the first DCI;
the first value and the second value meet any one of the following:
the first value is a sum of the first trigger offset value and a first offset value, and the second value is the first preset threshold;
the first value is the first trigger offset value, and the second value is a sum of the first preset threshold and a second offset value;
the first value is the first trigger offset value, and the second value is the second preset threshold;
the first value is the second trigger offset value, and the second value is the first preset threshold; and
the first value is the second trigger offset value, and the second value is the second preset threshold;
where both the first offset value and the second offset value are determined based on a delay required for beam switching.

Optionally, in a case that the first parameter information includes QCL information, the first target RS is a semi-persistent RS, and the first target RS corresponds to first information of a neighboring cell of the terminal, the obtaining first parameter information corresponding to a first target reference signal RS includes:
in a case that the first target RS is activated by using a first media access control MAC control element CE command, after a target effective time domain resource, determining that QCL information of the first target RS is valid QCL information, where the target effective time domain resource is a resource determined based on a reference effective time domain resource and a third offset value;
where the reference effective time domain resource is corresponding to a local cell of the terminal; and the third offset value is determined based on at least one of the following: a delay of sending the first MAC CE command to the terminal by a network-side device, a delay of sending acknowledgement information of the first MAC CE command to the network-side device by the terminal, a delay required for beam switching, or a delay of sending an RS to the terminal by the network-side device in the neighboring cell of the terminal.

Optionally, the method further includes at least one of the following:
stopping performing a sending or receiving operation of fourth information in a first time period;
performing a sending or receiving operation of fifth information in the first time period; or
performing rate matching on a physical downlink shared channel PDSCH in the first time period;

where the first time period is related to transmission time of a second target RS; the fourth information is a channel or an RS of a third object; the fifth information is a channel or an RS, in the channel or the RS of the third object, that has a QCL relationship with the second target RS; and the third object is a cell, a physical cell, a TRP, or a beam corresponding to a third target RS, the third target RS is one of the first RS and the second RS, and the second target RS is the other of the first RS and the second RS.

Optionally, the first time period includes:

first transmission time and first offset time, where the first transmission time is the transmission time of the second target RS, and the first offset time includes at least one of first sub-offset time or second sub-offset time;

where the first sub-offset time is located before the first transmission time, and is consecutive with the first transmission time; and the second sub-offset time is after the first transmission time, and is consecutive with the first transmission time.

Optionally, in a case that the second target RS is the second RS, the transmission time of the second target RS is determined based on at least one of the following:

timing information corresponding to the second RS; or
timing information corresponding to the first RS.

Optionally, the method further includes at least one of the following:

stopping performing a sending operation of sixth information in a second time period; or performing a sending operation of seventh information in the second time period;

where the second time period is related to transmission time of a channel or an RS of a fourth object; the sixth information is a fifth target RS; the seventh information is an RS, in the fifth target RS, that has a QCL relationship with the channel or the RS of the fourth object; and the fourth object is a cell, a physical cell, a TRP, or a beam corresponding to a fourth target RS, the fourth target RS is one of the first RS and the second RS, and the fifth target RS is the other of the first RS and the second RS.

Optionally, the second time period includes:

second transmission time and second offset time, where the second transmission time is the transmission time of the channel or the RS of the fourth object, and the second offset time includes at least one of third sub-offset time or fourth sub-offset time;

where the third sub-offset time is before the second transmission time, and is consecutive with the second transmission time; and the fourth sub-offset time is after the second transmission time, and is consecutive with the second transmission time.

Optionally, the sending the second RS according to the first parameter information corresponding to the first target RS includes:

sending the second RS during running of a second CSI processing unit according to the first parameter information corresponding to the first target RS;

where running duration of the second CSI processing unit is determined based on any one of the following:

first $(Z_1, Z_1')$, where the first $(Z_1, Z_1')$ is any $(Z_1, Z_1')$ of T $(Z_1, Z_1')$ with a largest value in Q candidate $(Z_1, Z_1')$; and second $(Z_1, Z_1')$, where the second $(Z_1, Z_1')$ is determined based on third $(Z_1, Z_1')$ and a fourth offset value, and the third $(Z_1, Z_1')$ is any $(Z_1, Z_1')$ of Q candidate $(Z_1, Z_1')$;

where T and Q are positive integers, and the fourth offset value is determined based on a delay required for beam switching.

Optionally, before the sending the second RS according to the first parameter information corresponding to the first target RS, the method further includes:

sending configuration information, where the configuration information is used to indicate the terminal to send and report a layer-1 signal to interference plus noise ratio L1-SINR, the configuration information is configured with the first information corresponding to the first RS and the second RS, and the first information corresponding to the first RS and the second RS is different.

Optionally, the method further includes:

sending the first RS according to the first parameter information corresponding to the first RS.

It should be noted that this embodiment is used as an embodiment of the network-side device corresponding to the method embodiment in FIG. 3. Therefore, references may be made to related descriptions in the method embodiment in FIG. 3, and a same beneficial effect may be achieved. To avoid repetition of description, details are not described herein again.

It should be noted that the plurality of optional implementations described in the embodiments of this disclosure may be implemented in combination with each other, or may be separately implemented, which is not limited in the embodiments of this disclosure.

For ease of understanding, an example is described as follows:

This example may include the following content:

(1) A network sends configuration information of an L1-SINR report to UE.

a) The configuration information may indicate an inter-cell, an inter-physical cell, or inter-multi-TRP L1-SINR report.

b) The network configures resource settings of a CMR and an IMR. In the resource setting of the CMR and the resource setting of the IMR, at least one CMR and its associated IMR are corresponding to different first information.

i. The first information may be cell identity information (such as a cell index or a cell ID), a PCI, a TRP identity information (such as a TRP ID or a higher layer parameter CORESETPoolIndex), frequency information, subcarrier spacing SCS information, numerology information, TA information, and beam information.

ii. TCI state information or QCL information of the CMR and the IMR includes different first information.

For example, the CMR is an NZP CSI-RS, and the IMR is a CSI-IM. In the configuration information of the CMR, parameter TCI-State or QCL-Info includes PCI1, and in the configuration information of the IMR, parameter TCI-State or QCL-Info includes PCI2.

iii. The resource setting information of the CMR and the IMR includes different first information.

For example, if the network is configured with CSI-ReportConfig, and parameter reportQuantity is cri-SINR, it indicates L1-SINR measurement and reporting.

In CSI-ReportConfig, parameter resourcesForChannelMeasurement is CMR, csi-IM-ResourcesForInterference or nzp-CSI-RS-ResourcesForInterference is a CSI-IM or an NZP CSI-RS.

CSI-ResourceConfig of the CMR includes PCI1, and CSI-ResourceConfig of the IMR includes PCI2.

iv. Resource setting information of the CMR and the IMR includes different first information.

For example, similar to the previous one, NZP-CSI-RS-ResourceSet in CSI-ResourceConfig of the CMR includes PCI1, csi-IM-ResourceSet in CSI-ResourceConfig of the CSI-IM includes PCI2, or NZP-CSI-RS-ResourceSet in CSI-ResourceConfig of the NZP CSI-RS for interference measurement includes PCI2.

Alternatively, NZP-CSI-RS-Resource of the CMR includes PCI1, CSI-IM-Resource of the CSI-IM includes PCI2, or NZP-CSI-RS-Resource of the NZP CSI-RS for interference measurement includes PCI2.

v. The resource setting information of the CMR and the IMR includes different timing information.

For example, the resource setting of the CMR and the resource setting of the IMR respectively include a parameter 1 and a parameter 2, where the parameter 1 indicates timing information (for example, timing information of PCI1) of first information corresponding to the CMR and the parameter 2 indicates timing information (for example, timing information of PCI2) of first information corresponding to the IMR.

vi. In QCL information of the CMR and the IMR, QCL source RSs are SSBs or TRSs corresponding to different first information.

For example, in TCI-State or QCL-Info of the CMR and the IMR, QCL source RSs are respectively SSB1/TRS1 and SSB2/TRS2, where SSB1/TRS1 and SSB2/TRS2 are corresponding to different first information, for example, are corresponding to PCI1 and PCI2 respectively.

(2) The network sends the CMR and the IMR to the UE for channel measurement and interference measurement.

a) If the CMR or the IMR is aperiodic, and corresponds to first information of a neighboring cell or a non-serving cell, when the network triggers the aperiodic RS by using DCI:

i. A first offset value is added based on a value of a trigger offset and/or a preset threshold as a trigger offset and/or a first preset threshold of the aperiodic RS.

1) The value of trigger offset and/or the preset threshold is applicable to a local cell or a serving cell.

2) The first offset value is determined according to time required by the UE to switch a parameter such as a beam. For example:

When an aperiodic CSI-RS triggered by the DCI is corresponding to the local cell, when an offset between the DCI and the aperiodic CSI-RS is less than the preset threshold reported by the UE, default QCL information is used, and if the offset is greater than or equal to the preset threshold, QCL information indicated by the DCI is used.

Therefore, when the aperiodic CSI-RS triggered by the DCI is corresponding to the neighboring cell, offset+delta may be compared with the preset threshold reported by the UE when the QCL information of the aperiodic CSI-RS is determined. Alternatively, the offset is compared with the preset threshold reported by the UE+delta, and in this case, the first preset threshold is the preset threshold reported by the UE+delta. Alternatively, the offset is compared with the first preset threshold reported by the UE, where the first preset threshold is applicable to a beam switching requirement of RS measurement in the neighboring cell.

ii. A value of the trigger offset/the first preset threshold applicable to the neighboring cell or the non-serving cell is always used.

iii. When the aperiodic RS is triggered, and a trigger offset is less than or equal to the preset threshold, the aperiodic RS is received by using default TCI state information or default QCL information.

The aperiodic RS of the neighboring cell or the non-serving cell is received or buffered (buffer) according to timing information of the local cell or the serving cell.

For example, when the DCI triggers the aperiodic CSI-RS of the neighboring cell, the offset between the DCI and the aperiodic CSI-RS is less than the preset threshold, the default QCL information needs to be used. Because time at which a signal of a TRP of the neighboring cell arrives at the UE is longer than time at which a signal of a TRP of the local cell arrives at the UE, for example, a timing offset exists, when to use the default QCL information of the aperiodic CSI-RS from the neighboring cell may be determined according to the timing information of the local cell.

b) If the CMR or the IMR is semi-persistent, and corresponds to first information of a neighboring cell or a non-serving cell, when the network uses a MAC CE to activate or deactivate the semi-persistent RS:

when the semi-persistent RS activated or deactivated by the MAC CE is corresponding to the local cell, assuming that acknowledgment information (for example, HARQ-ACK information carried in a PUCCH) corresponding to a PDSCH in which the MAC CE is located is in slot n, the activated or deactivated semi-persistent RS resource (set) applies QCL information sub of the semi-persistent RS after slot $n+3N_{slot}^{subframe,\mu}$ (where $\mu$ is a subcarrier spacing SCS of a carrier on which the PUCCH is located) or the semi-persistent RS is not used.

When the semi-persistent RS activated or deactivated by the MAC CE is corresponding to the neighboring cell, a second offset value is added based on effective time of the local cell corresponding to the semi-persistent RS activated or deactivated by the MAC CE, and is used as effective time of the QCL information of the semi-persistent RS or effective time of the semi-persistent RS is not used. The second offset value may include at least one of the following: a delay of sending a MAC CE command to the UE by the network, a delay of sending acknowledgement information to the network by the UE, a delay of beam switching by the UE (to receive an RS of the neighboring cell), a delay of sending an RS to the UE by the network in the neighboring cell, or the like.

For example, when the semi-persistent CSI-RS activated by the MAC CE is corresponding to the neighboring cell, during determining of the QCL information of the semi-persistent CSI-RS, the effective time is changed to slot $n+3N_{slot}^{subframe,\mu}$+delta, that is, after the effective time, the semi-persistent CSI-RS of the neighboring cell uses activated QCL information.

(3) When measuring an L1-SINR, the UE determines some parameter information (possibly not all parameter information) of the IMR according to some parameter information of the CMR, and performs channel measurement and interference measurement.

a) Determine QCL information of the IMR according to the CMR or QCL information of the CMR.

If the CMR is an SSB resource, the CMR is used for the QCL-TypeD RS of the IMR.

If the CMR is an NZP CSI-RS resource, the QCL-TypeD RS of the CMR is used for the QCL-TypeD RS of the IMR.

b) Determine timing information of the IMR according to timing information corresponding to the CMR.

The timing information corresponding to the CMR refers to any one of the following:
  timing information of a cell/physical cell/TRP in which the CMR is located;
  timing information of first information corresponding to the CMR; and
  timing information of a cell/physical cell/TRP corresponding to first information corresponding to the CMR.

The timing information of the IMR has the same meaning as above.

Optionally, the determining timing information of the IMR may refer to that the IMR uses the timing information of the CMR.

c) Determine a QCL-TypeA RS of the IMR according to the CMR or a QCL-TypeA RS of the CMR.

If the CMR is an SSB, the SSB or a TRS associated with the SSB is used as the QCL-TypeA RS of the IMR.

If the CMR is an NZP CSI-RS, the QCL-TypeA RS of the CMR is used as the QCL-TypeA RS of the IMR.

The QCL-TypeA RS of the CMR may be a QCL-TypeA RS in TCI state information or QCL information of the CMR. The IMR is described as above.

Applicable to the following cases: The network is not configured with TCI state information or QCL information of the IMR; and the network is configured with TCI state information or QCL information of the IMR.

d) Performing interference measurement on the IMR may be any one of the following:
  i. The UE performs interference measurement on the IMR according to timing information of the CMR and/or timing information of the IMR.
  ii. The UE performs interference measurement on the IMR according to QCL-TypeA information of the CMR and/or QCL-TypeA information of the IMR.
  iii. The UE reports timing information (difference) or QCL-TypeA information (difference) of the CMR and the IMR. The network determines, according to the timing information or the QCL-TypeA information of the CMR, time for sending the IMR, for example, in advance or delayed, for the UE to perform interference.

For example, the CMR is sent by TRP1 to the UE, and the IMR is sent by TRP2 to the UE. TRP1 corresponds to PCI1, and TRP2 corresponds to PCI2. Because paths between the two TRPs and the UE are different, timing information is different. As shown in FIG. 4, positions of a head symbol and a tail symbol of the CMR are T1 and T2, and positions of a head symbol and a tail symbol of the IMR are T3 and T4. Because the IMR arrives later, a CP of an OFDM symbol cannot effectively complete receiving and measurement of the IMR. Therefore, interference measurement may be performed in the following manner:

The IMR is measured by using an FFT window position used by a symbol in CMR measurement. In this case, only a partial IMR symbol between T3 and T2 is detected, or a part of a previous IMR symbol falling into the window and a part of a current IMR symbol falling into the window are detected.

Alternatively, the IMR is measured by using an FFT window position used by a symbol in IMR measurement. In this case, the detected symbol is a complete IMR symbol.

(4) Scheduling limitation and rate matching

Within target time, at least one of the following:
  within transmission time of the CMR and within previous preset duration and/or subsequent preset duration;
  within transmission time of the IMR and within previous preset duration and/or subsequent preset duration;
  within transmission time of the CMR determined according to timing information of the CMR, and within previous preset duration and/or subsequent preset duration;
  within transmission time of the IMR determined according to timing information of the IMR, and within previous preset duration and/or subsequent preset duration; or
  within transmission time of the IMR determined according to timing information of the IMR that is determined according to timing information of the CMR, and within previous preset duration and/or subsequent preset duration.

a) When the network sends the IMR on a cell/physical cell/TRP/beam corresponding to the IMR, perform at least one of the following on the cell/physical cell/TRP/beam corresponding to the CMR:
  another channel or RS is not transmitted;
  another channel or RS that has a QCL relationship with the IMR may be transmitted; or
  rate matching is performed on the PDSCH.

b) On the cell/physical cell/TRP/beam corresponding to the CMR, at least one of the following is performed for the cell/physical cell/TRP/beam corresponding to the IMR within transmission time of the CMR or another channel/signal and within previous preset duration and/or subsequent preset duration:
  the IMR is not to be transmitted; or
  an IMR having a QCL relationship with the CMR or another channel/signal may be transmitted.

(5) Time requirement of L1-SINR measurement

A larger value is obtained from candidate value $(Z_1, Z_1')$; alternatively, delta is added to a value of $(Z_1, Z_1')$ to implement measurement of the RS from the neighboring cell.

In this embodiment of this disclosure, during L1-SINR measurement, for the CMR and the IMR that are corresponding to information such as different cells/PCIs/TRPs/beams, the timing information and the QCL information of the IMR are determined according to the timing information and the QCL information that are corresponding to the CMR.

It should be noted that the measurement method provided in this embodiment of this disclosure may be performed by a measurement apparatus, or a control module that is in the measurement apparatus and that is configured to perform the measurement method. In this embodiment of this disclosure, that the measurement method is performed by the measurement apparatus is used as an example to describe the measurement apparatus provided in this embodiment of this disclosure.

FIG. 6 is a structural diagram of a measurement apparatus according to an embodiment of this disclosure.

As shown in FIG. 6, the measurement apparatus 600 includes:
  a first obtaining module 601, configured to obtain first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information; and
  a first measurement module 602, configured to measure the second RS according to the first parameter information corresponding to the first target RS.

Optionally, the first parameter information includes at least one of timing information or quasi-co-location QCL information, where the QCL information includes at least one of first-type QCL information and second-type QCL information, the first-type QCL information is beam information, and the second-type QCL information includes at least one of time domain information or frequency domain information.

Optionally, in a case that the first parameter information includes timing information, the first parameter information corresponding to the first target RS includes any one of the following:
  timing information associated with a first object, where the first object is an object in which the first target RS is located;
  timing information associated with first information corresponding to the first target RS; and
  timing information associated with a second object, where the second object is an object associated with the first information corresponding to the first target RS;
  where the object is a cell, a physical cell, a transmitting receiving point TRP, or a beam.

Optionally, that the first RS and the second RS are corresponding to different first information includes:
  target information associated with the first RS and the second RS is corresponding to different first information; and
  the target information includes at least one of the following: QCL information; resource setting information; second information of resource setting information; or a source RS of QCL information;
  where the second information is timing information or a parameter indicating timing information.

Optionally, the first information includes at least one of the following: cell identity information, physical cell identifier PCI information, transmitting receiving point TRP identity information, frequency information, subcarrier spacing SCS information, numerology information, timing advance TA information, or QCL information.

Optionally, the first measurement module 602 includes:
  a first obtaining unit, configured to obtain second parameter information, where the second parameter information is determined based on the first parameter information corresponding to the first target RS; and
  a measurement unit, configured to measure the second RS according to the second parameter information.

Optionally, in a case that the first target RS includes the second RS, the first obtaining module 601 is configured to perform any one of the following:
  determining, according to the first RS, first parameter information corresponding to the second RS; and
  in a case that a first condition is met, determining, according to the first RS, the first parameter information corresponding to the second RS.

Optionally, in a case that the first parameter information is QCL information, that the first condition is met includes that the QCL information corresponding to the first RS is not default QCL information.

Optionally, in a case that the first parameter information includes timing information, when determining, according to the first RS, the first parameter information corresponding to the second RS, the first obtaining module is further configured to:
  determine timing information corresponding to the first RS as timing information corresponding to the second RS.

Optionally, in a case that the first parameter information includes QCL information, when determining, according to the first RS, the first parameter information corresponding to the second RS, the first obtaining module is configured to:
  in a case that the first RS is a synchronization signal/physical broadcast channel block SSB, determine the first RS or a first tracking reference signal TRS as QCL information corresponding to the second RS, where the first TRS is a TRS corresponding to the first RS; or
  in a case that the first RS is a non-zero power NZP channel state information CSI-RS, determine QCL information corresponding to the first RS as QCL information corresponding to the second RS.

Optionally, in a case that the first parameter information includes QCL information, the first target RS is an aperiodic RS, and the first target RS is corresponding to first information of a neighboring cell of the terminal, the first obtaining module is configured to:
  in a case that the first target RS is triggered by using first downlink control information DCI, determine, according to a target trigger offset value and a target preset threshold, QCL information corresponding to the first target RS;
  where the target trigger offset value is a first trigger offset value or a second trigger offset value, the first trigger offset value is corresponding to a local cell of the terminal, and the second trigger offset value is corresponding to the neighboring cell of the terminal; and the target preset threshold is a first preset threshold or a second preset threshold, the first preset threshold is corresponding to the local cell of the terminal, and the second preset threshold is corresponding to the neighboring cell of the terminal.

Optionally, the first obtaining module is configured to perform at least one of the following:
  in a case that a first value is less than a second value, the QCL information corresponding to the first target RS is default QCL information; or
  in a case that a first value is greater than or equal to a second value, the QCL information corresponding to the first target RS is QCL information indicated by the first DCI;
  the first value and the second value meet any one of the following:
  the first value is a sum of the first trigger offset value and a first offset value, and the second value is the first preset threshold;
  the first value is the first trigger offset value, and the second value is a sum of the first preset threshold and a second offset value;
  the first value is the first trigger offset value, and the second value is the second preset threshold;
  the first value is the second trigger offset value, and the second value is the first preset threshold; and
  the first value is the second trigger offset value, and the second value is the second preset threshold;
  where both the first offset value and the second offset value are determined based on a delay required for beam switching.

Optionally, in a case that the first parameter information includes QCL information, the first target RS is a semi-persistent RS, and the first target RS is corresponding to first information of a neighboring cell of the terminal, the first obtaining module is configured to:
  in a case that the first target RS is activated by using a first media access control MAC control element CE command, after a target effective time domain resource, determine that QCL information of the first target RS is valid QCL information, where the target effective time domain resource is a resource determined based on a reference effective time domain resource and a third offset value;

where the reference effective time domain resource is corresponding to a local cell of the terminal; and the third offset value is determined based on at least one of the following: a delay of sending the first MAC CE command to the terminal by a network-side device, a delay of sending acknowledgement information of the first MAC CE command to the network-side device by the terminal, a delay required for beam switching, or a delay of sending an RS to the terminal by the network-side device in the neighboring cell of the terminal.

Optionally, the measurement apparatus 600 further includes a first execution module, configured to perform at least one of the following:

stopping performing a sending or receiving operation of fourth information in a first time period;

performing a sending or receiving operation of fifth information in the first time period; or performing rate matching on a physical downlink shared channel PDSCH in the first time period;

where the first time period is related to transmission time of a second target RS; the fourth information is a channel or an RS of a third object; the fifth information is a channel or an RS, in the channel or the RS of the third object, that has a QCL relationship with the second target RS; and the third object is a cell, a physical cell, a TRP, or a beam corresponding to a third target RS, the third target RS is one of the first RS and the second RS, and the second target RS is the other of the first RS and the second RS.

Optionally, the first time period includes:

first transmission time and first offset time, where the first transmission time is the transmission time of the second target RS, and the first offset time includes at least one of first sub-offset time or second sub-offset time;

where the first sub-offset time is located before the first transmission time, and is consecutive with the first transmission time; and the second sub-offset time is after the first transmission time, and is consecutive with the first transmission time.

Optionally, in a case that the second target RS is the second RS, the transmission time of the second target RS is determined based on at least one of the following:

timing information corresponding to the second RS; or timing information corresponding to the first RS.

Optionally, the measurement apparatus 600 further includes a second execution module, configured to perform at least one of the following:

stopping performing a measurement operation of sixth information in a second time period; or performing a measurement operation of seventh information in the second time period;

where the second time period is related to transmission time of a channel or an RS of a fourth object; the sixth information is a fifth target RS; the seventh information is an RS, in the fifth target RS, that has a QCL relationship with the channel or the RS of the fourth object; and the fourth object is a cell, a physical cell, a TRP, or a beam corresponding to a fourth target RS, the fourth target RS is one of the first RS and the second RS, and the fifth target RS is the other of the first RS and the second RS.

Optionally, the second time period includes:

second transmission time and second offset time, where the second transmission time is the transmission time of the channel or the RS of the fourth object, and the second offset time includes at least one of third sub-offset time or fourth sub-offset time;

where the third sub-offset time is before the second transmission time, and is consecutive with the second transmission time; and the fourth sub-offset time is after the second transmission time, and is consecutive with the second transmission time.

Optionally, the first measurement module 601 is configured to:

measure the second RS during running of a CSI processing unit according to the first parameter information corresponding to the first target RS;

where running duration of the CSI processing unit is determined based on any one of the following:

first $(Z_1, Z_1')$, where the first $(Z_1, Z_1')$ is any $(Z_1, Z_1')$ of T $(Z_1, Z_1')$ with a largest value in Q candidate $(Z_1, Z_1')$; and second $(Z_1, Z_1')$, where the second $(Z_1, Z_1')$ is determined based on third $(Z_1, Z_1')$ and a fourth offset value, and the third $(Z_1, Z_1')$ is any $(Z_1, Z_1')$ of Q candidate $(Z_1, Z_1')$;

where T and Q are positive integers, and the fourth offset value is determined based on a delay required for beam switching.

Optionally, the measurement apparatus 600 further includes:

a first receiving module, configured to receive configuration information, where the configuration information is used to indicate the terminal to measure and report a layer-1 signal to interference plus noise ratio L1-SINR, the configuration information is configured with the first information corresponding to the first RS and the second RS, and the first information corresponding to the first RS and the second RS is different.

Optionally, the measurement apparatus 600 further includes:

a second measurement module, configured to measure the first RS according to the first parameter information corresponding to the first RS.

The measurement apparatus in this embodiment of this disclosure may be an apparatus, or may be a component, an integrated circuit, or a chip in a terminal. The apparatus may be a mobile terminal, or may be a non-mobile terminal. For example, the mobile terminal may include but is not limited to the type of the terminal 11 listed above. The non-mobile terminal may be a server, a network attached storage (NAS), a personal computer (PC), a television (TV), a teller machine, or a self-service machine. This is not specifically limited in this embodiment of this disclosure.

The measurement apparatus in this embodiment of this disclosure may be an apparatus with an operating system. The operating system may be an Android operating system, may be an ios operating system, or may be another possible operating system. This is not specifically limited in this embodiment of this disclosure.

The measurement apparatus 600 provided in this embodiment of this disclosure can implement processes implemented in the method embodiment of FIG. 2, and achieve a same technical effect. To avoid repetition, details are not described herein again.

It should be noted that, in the sending method provided in this embodiment of this disclosure, the execution entity may be a sending apparatus, or a control module that is in the sending apparatus and that is used to perform the sending method. In this embodiment of this disclosure, that the sending apparatus performs the sending method is used as an example to describe the sending apparatus provided in this embodiment of this disclosure.

FIG. 7 is a structural diagram of a sending apparatus according to an embodiment of this disclosure.

As shown in FIG. 7, the sending apparatus 700 includes:
a second obtaining module 701, configured to obtain first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information; and
a first sending module 702, configured to send the second RS according to the first parameter information corresponding to the first target RS.

Optionally, the first parameter information includes at least one of timing information or quasi co-location QCL information; and
the QCL information includes at least one of first-type QCL information or second-type QCL information, the first-type QCL information is beam information, and the second-type QCL information includes at least one of time domain information or frequency domain information.

Optionally, in a case that the first parameter information includes timing information, the first parameter information corresponding to the first target RS includes any one of the following:
timing information associated with a first object, where the first object is an object in which the first target RS is located;
timing information associated with first information corresponding to the first target RS; and
timing information associated with a second object, where the second object is an object associated with the first information corresponding to the first target RS;
where the object is a cell, a physical cell, a transmitting receiving point TRP, or a beam.

Optionally, that the first RS and the second RS are corresponding to different first information includes:
target information associated with the first RS and the second RS is corresponding to different first information; and
the target information includes at least one of the following: QCL information; resource setting information; second information of resource setting information; or a source RS of QCL information;
where the second information is timing information or a parameter indicating timing information.

Optionally, the first information includes at least one of the following: cell identity information, physical cell identifier PCI information, transmitting receiving point TRP identity information, frequency information, subcarrier spacing SCS information, numerology information, timing advance TA information, or QCL information.

Optionally, the first sending module 702 includes:
a second obtaining unit, configured to obtain second parameter information, where the second parameter information is determined based on the first parameter information corresponding to the first target RS; and
a sending unit, configured to send the second RS according to the second parameter information.

Optionally, in a case that the first target RS includes the second RS, the second obtaining module 701 is configured to perform any one of the following:
determining, according to the first RS, first parameter information corresponding to the second RS; and
in a case that a first condition is met, determining, according to the first RS, the first parameter information corresponding to the second RS.

Optionally, in a case that the first parameter information is QCL information, that the first condition is met includes that the QCL information corresponding to the first RS is not default QCL information.

Optionally, in a case that the first parameter information includes timing information, when determining, according to the first RS, the first parameter information corresponding to the second RS, the second obtaining module 701 is configured to:
determine timing information corresponding to the first RS as timing information corresponding to the second RS.

In a case of determining, according to the first RS, that the first parameter information corresponding to the second RS includes QCL information, when determining, according to the first RS, the first parameter information corresponding to the second RS, the second obtaining module 701 is configured to perform at least one of the following:
in a case that the first RS is a synchronization signal/physical broadcast channel block SSB, determining the first RS or a first tracking reference signal TRS as QCL information corresponding to the second RS, where the first TRS is a TRS corresponding to the first RS; or
in a case that the first RS is a non-zero power NZP channel state information CSI-RS, determining QCL information corresponding to the first RS as QCL information corresponding to the second RS.

Optionally, in a case that the first parameter information includes QCL information, the first target RS is an aperiodic RS, and the first target RS is corresponding to first information of a neighboring cell of the terminal, the second obtaining module 701 is configured to:
in a case that the first target RS is triggered by using first downlink control information DCI, determine, according to a target trigger offset value and a target preset threshold, QCL information corresponding to the first target RS;
where the target trigger offset value is a first trigger offset value or a second trigger offset value, the first trigger offset value is corresponding to a local cell of the terminal, and the second trigger offset value is corresponding to the neighboring cell of the terminal; and the target preset threshold is a first preset threshold or a second preset threshold, the first preset threshold is corresponding to the local cell of the terminal, and the second preset threshold is corresponding to the neighboring cell of the terminal.

Optionally, the second obtaining module 701 is configured to perform at least one of the following:
in a case that a first value is less than a second value, the QCL information corresponding to the first target RS is default QCL information; or
in a case that a first value is greater than or equal to a second value, the QCL information corresponding to the first target RS is QCL information indicated by the first DCI;

the first value and the second value meet any one of the following:
    the first value is a sum of the first trigger offset value and a first offset value, and the second value is the first preset threshold;
    the first value is the first trigger offset value, and the second value is a sum of the first preset threshold and a second offset value;
    the first value is the first trigger offset value, and the second value is the second preset threshold;
    the first value is the second trigger offset value, and the second value is the first preset threshold; and
    the first value is the second trigger offset value, and the second value is the second preset threshold;
    where both the first offset value and the second offset value are determined based on a delay required for beam switching.

Optionally, in a case that the first parameter information includes QCL information, the first target RS is a semi-persistent RS, and the first target RS is corresponding to first information of a neighboring cell of the terminal, the second obtaining module 701 is configured to:
    in a case that the first target RS is activated by using a first media access control MAC control element CE command, after a target effective time domain resource, determine that QCL information of the first target RS is valid QCL information, where the target effective time domain resource is a resource determined based on a reference effective time domain resource and a third offset value;
    where the reference effective time domain resource is corresponding to a local cell of the terminal; and the third offset value is determined based on at least one of the following: a delay of sending the first MAC CE command to the terminal by a network-side device, a delay of sending acknowledgement information of the first MAC CE command to the network-side device by the terminal, a delay required for beam switching, or a delay of sending an RS to the terminal by the network-side device in the neighboring cell of the terminal.

Optionally, the sending apparatus further includes a third execution module, configured to perform at least one of the following:
    stopping performing a sending or receiving operation of fourth information in a first time period;
    performing a sending or receiving operation of fifth information in the first time period; or
    performing rate matching on a physical downlink shared channel PDSCH in the first time period;
    where the first time period is related to transmission time of a second target RS; the fourth information is a channel or an RS of a third object; the fifth information is a channel or an RS, in the channel or the RS of the third object, that has a QCL relationship with the second target RS; and the third object is a cell, a physical cell, a TRP, or a beam corresponding to a third target RS, the third target RS is one of the first RS and the second RS, and the second target RS is the other of the first RS and the second RS.

Optionally, the first time period includes:
    first transmission time and first offset time, where the first transmission time is the transmission time of the second target RS, and the first offset time includes at least one of first sub-offset time or second sub-offset time;
    where the first sub-offset time is located before the first transmission time, and is consecutive with the first transmission time; and the second sub-offset time is after the first transmission time, and is consecutive with the first transmission time.

Optionally, in a case that the second target RS is the second RS, the transmission time of the second target RS is determined based on at least one of the following:
    timing information corresponding to the second RS; or
    timing information corresponding to the first RS.

Optionally, the sending apparatus further includes a fourth execution module, configured to perform at least one of the following:
    stopping performing a sending operation of sixth information in a second time period; or
    performing a sending operation of seventh information in the second time period;
    where the second time period is related to transmission time of a channel or an RS of a fourth object; the sixth information is a fifth target RS; the seventh information is an RS, in the fifth target RS, that has a QCL relationship with the channel or the RS of the fourth object; and the fourth object is a cell, a physical cell, a TRP, or a beam corresponding to a fourth target RS, the fourth target RS is one of the first RS and the second RS, and the fifth target RS is the other of the first RS and the second RS.

Optionally, the second time period includes:
    second transmission time and second offset time, where the second transmission time is the transmission time of the channel or the RS of the fourth object, and the second offset time includes at least one of third sub-offset time or fourth sub-offset time;
    where the third sub-offset time is before the second transmission time, and is consecutive with the second transmission time; and the fourth sub-offset time is after the second transmission time, and is consecutive with the second transmission time.

Optionally, the first sending module 702 is configured to:
    send the second RS during running of a second CSI processing unit according to the first parameter information corresponding to the first target RS;
    where running duration of the second CSI processing unit is determined based on any one of the following:
    first $(Z_1, Z_1')$, where the first $(Z_1, Z_1')$ is any $(Z_1, Z_1')$ of T $(Z_1, Z_1')$ with a largest value in Q candidate $(Z_1, Z_1')$; and
    second $(Z_1, Z_1')$, where the second $(Z_1, Z_1')$ is determined based on third $(Z_1, Z_1')$ and a fourth offset value, and the third $(Z_1, Z_1')$ is any $(Z_1, Z_1')$ of Q candidate $(Z_1, Z_1')$;
    where T and Q are positive integers, and the fourth offset value is determined based on a delay required for beam switching.

Optionally, the sending apparatus 700 further includes:
    a second sending module, configured to send configuration information, where the configuration information is used to indicate the terminal to send and report a layer-1 signal to interference plus noise ratio L1-SINR, the configuration information is configured with the first information corresponding to the first RS and the second RS, and the first information corresponding to the first RS and the second RS is different.

Optionally, the sending apparatus 700 further includes:
    a third sending module, configured to send the first RS according to the first parameter information corresponding to the first RS.

The sending apparatus in this embodiment of this disclosure may be an apparatus, or may be a component, an integrated circuit, or a chip in a network-side device. The network-side device may include but is not limited to the type of the network-side device 12 listed above. This is not specifically limited in this embodiment of this disclosure.

The sending apparatus 700 provided in this embodiment of this disclosure can implement processes implemented in the method embodiment of FIG. 3, and achieve a same technical effect. To avoid repetition, details are not described herein again.

Figure 8:
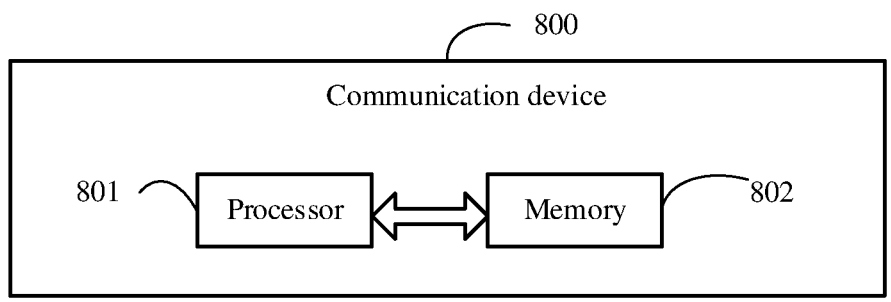
FIG. 8 is a structural diagram of a communication device according to an embodiment of this disclosure.

Optionally, as shown in FIG. 8, an embodiment of this disclosure further provides a communication device 800, including a processor 801, a memory 802, and a program or instructions stored in the memory 802 and executable on the processor 801. For example, when the communication device 800 is a terminal, each process of the foregoing method embodiment in FIG. 3 is implemented when the program or the instructions are executed by the processor 801, and a same technical effect can be achieved. When the communication device 800 is a network-side device, each process of the foregoing method embodiment in FIG. 5 is implemented when the program or the instructions are executed by the processor 801, and a same technical effect can be achieved. To avoid repetition, details are not described herein again.

Figure 9:
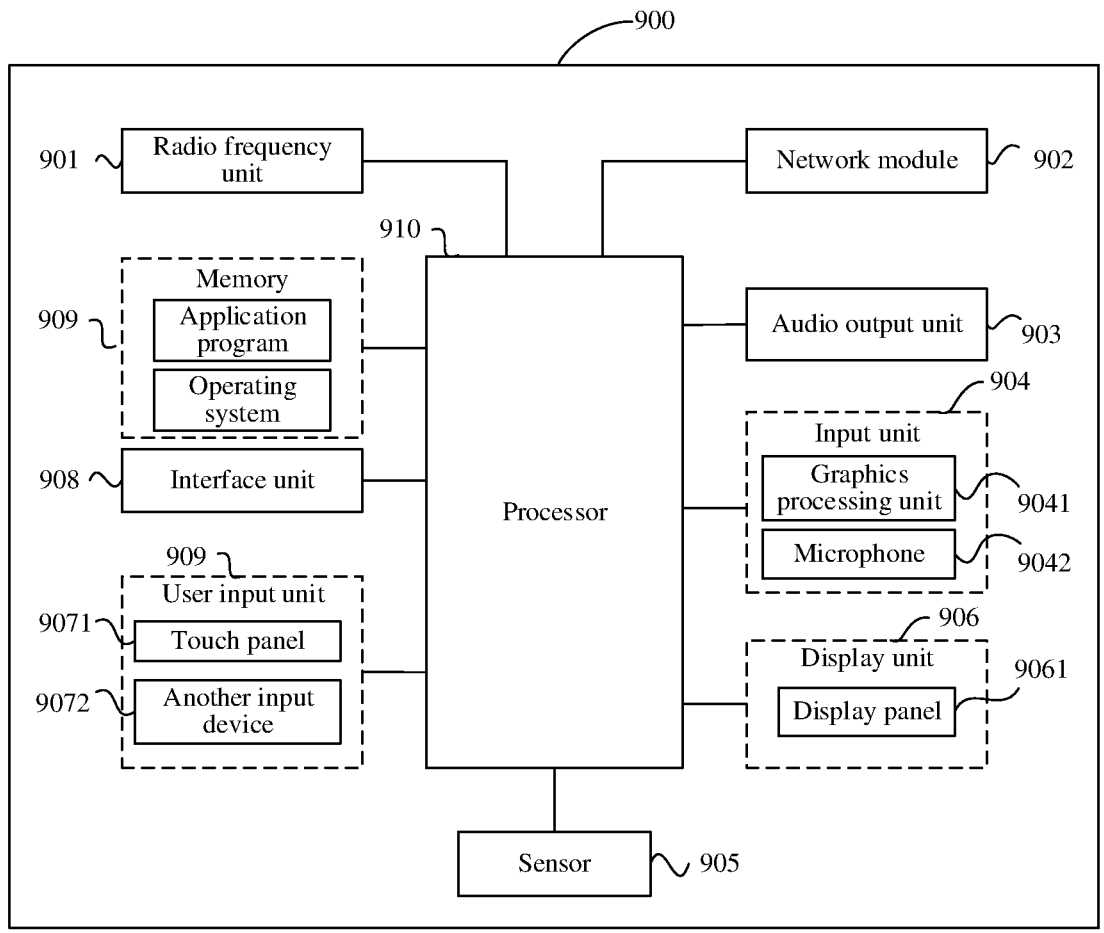
FIG. 9 is a structural diagram of a terminal according to an embodiment of this disclosure.
Figure 10:
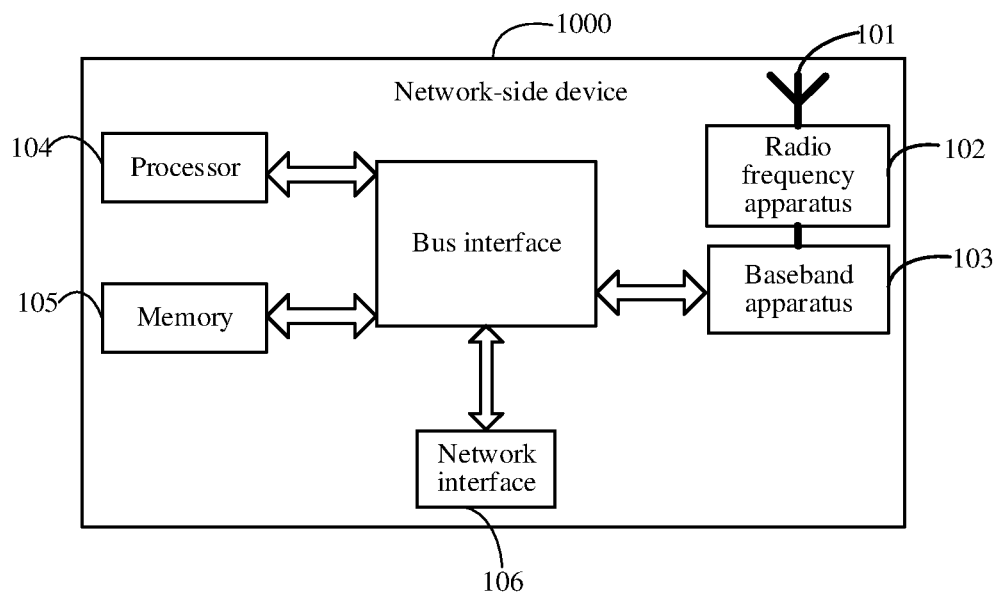
FIG. 10 is a structural diagram of a network-side device according to an embodiment of this disclosure.

FIG. 9 is a schematic diagram of a hardware structure of a terminal according to an embodiment of this disclosure.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include a power supply (for example, a battery) that supplies power to each component. The power supply may be logically connected to the processor 910 by using a power management system, so as to manage functions such as charging, discharging, and power consumption by using the power management system. The terminal structure shown in FIG. 9 constitutes no limitation on the terminal, and the terminal may include more or fewer components than those shown in the figure, or combine some components, or have different component arrangements.

It should be understood that, in this embodiment of this disclosure, the input unit 904 may include a graphics processing unit (Graphics Processing Unit, GPU) 9041 and a microphone 9042. The graphics processing unit 9041 processes image data of a still picture or a video obtained by an image capture apparatus (such as a camera) in a video capture mode or an image capture mode. The display unit 906 may include a display panel 9061. The display panel 9061 may be configured in a form such as a liquid crystal display or an organic light-emitting diode. The user input unit 907 may include a touch panel 9091 and another input device 9092. The touch panel 9091 is also referred to as a touchscreen. The touch panel 9091 may include two parts: a touch detection apparatus and a touch controller. The another input device 9092 may include but is not limited to a physical keyboard, a function key (such as a volume control key or an on/off key), a trackball, a mouse, and a joystick. Details are not described herein.

In this embodiment of this disclosure, after the radio frequency unit 901 receives downlink data from the network-side device, the downlink data is processed by the processor 910. In addition, uplink data is sent to the network-side device. Generally, the radio frequency unit 901 includes but is not limited to: an antenna, at least one amplifier, a transceiver, a coupler, a low noise amplifier, and a duplexer.

The memory 909 may be configured to store a software program, instructions, and various data. The memory 909 may mainly include a program or instruction storage area and a data storage area, where the program or instruction storage area may store an operating system, an application program or an instruction (such as a sound play function or an image play function) required by at least one function, and the like. In addition, the memory 909 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash memory device, or another non-volatile solid-state storage device.

The processor 910 may include one or more processing units. Optionally, the processor 910 may integrate an application processor and a modem processor. The application processor mainly processes an operating system, a user interface, an application program or an instruction, and the like. The modem processor mainly processes wireless communication such as a baseband processor. It may be understood that the modem processor may not be integrated into the processor 910.

The processor 910 is configured to: obtain first parameter information corresponding to a first target reference signal RS, where the first target RS includes at least one of a first RS or a second RS, the first RS is used for channel measurement, the second RS is used for interference measurement, the first RS is associated with the second RS, and the first RS and the second RS are corresponding to different first information; and measure the second RS according to the first parameter information corresponding to the first target RS.

Optionally, the first parameter information includes at least one of timing information or quasi co-location QCL information; and the QCL information includes at least one of first-type QCL information or second-type QCL information, the first-type QCL information is beam information, and the second-type QCL information includes at least one of time domain information or frequency domain information.

Optionally, in a case that the first parameter information includes timing information, the first parameter information corresponding to the first target RS includes any one of the following:

timing information associated with a first object, where the first object is an object in which the first target RS is located;

timing information associated with first information corresponding to the first target RS; and timing information associated with a second object, where the second object is an object associated with the first information corresponding to the first target RS;

where the object is a cell, a physical cell, a transmitting receiving point TRP, or a beam.

Optionally, that the first RS and the second RS are corresponding to different first information includes:

target information associated with the first RS and the second RS is corresponding to different first information; and the target information includes at least one of the following: QCL information; resource setting information; second information of resource setting information; or a source RS of QCL information;
where the second information is timing information or a parameter indicating timing information.

Optionally, the first information includes at least one of the following: cell identity information, physical cell identifier PCI information, transmitting receiving point TRP identity information, frequency information, subcarrier spacing SCS information, numerology information, timing advance TA information, or QCL information.

Optionally, the processor 910 is configured to obtain second parameter information, where the second parameter information is determined based on the first parameter information corresponding to the first target RS; and
measure the second RS according to the second parameter information.

Optionally, in a case that the first target RS includes the second RS, the processor 910 is configured to perform any one of the following:
determining, according to the first parameter information corresponding to the first RS or the first RS, first parameter information corresponding to the second RS; and
in a case that a first condition is met, determining, according to the first RS, the first parameter information corresponding to the second RS.

Optionally, in a case that the first parameter information is QCL information, that the first condition is met includes that the QCL information corresponding to the first RS is not default QCL information.

Optionally, in a case that the first parameter information includes timing information, the processor 910 is configured to:
determine timing information corresponding to the first RS as timing information corresponding to the second RS.

Optionally, in a case that the first parameter information includes QCL information, the processor 910 is configured to perform at least one of the following:
in a case that the first RS is a synchronization signal/physical broadcast channel block SSB, determining the first RS or a first tracking reference signal TRS as QCL information corresponding to the second RS, where the first TRS is a TRS corresponding to the first RS; or
in a case that the first RS is a non-zero power NZP channel state information CSI-RS, determining QCL information corresponding to the first RS as QCL information corresponding to the second RS.

Optionally, in a case that the first parameter information includes QCL information, the first target RS is an aperiodic RS, and the first target RS is corresponding to first information of a neighboring cell of the terminal, the processor 910 is configured to:
in a case that the first target RS is triggered by using first downlink control information DCI, determine, according to a target trigger offset value and a target preset threshold, QCL information corresponding to the first target RS;
where the target trigger offset value is a first trigger offset value or a second trigger offset value, the first trigger offset value is corresponding to a local cell of the terminal, and the second trigger offset value is corresponding to the neighboring cell of the terminal; and the target preset threshold is a first preset threshold or a second preset threshold, the first preset threshold is corresponding to the local cell of the terminal, and the second preset threshold is corresponding to the neighboring cell of the terminal.

Optionally, the processor 910 is configured to perform at least one of the following:
in a case that a first value is less than a second value, the QCL information corresponding to the first target RS is default QCL information; or
in a case that a first value is greater than or equal to a second value, the QCL information corresponding to the first target RS is QCL information indicated by the first DCI;
the first value and the second value meet any one of the following:
the first value is a sum of the first trigger offset value and a first offset value, and the second value is the first preset threshold;
the first value is the first trigger offset value, and the second value is a sum of the first preset threshold and a second offset value;
the first value is the first trigger offset value, and the second value is the second preset threshold;
the first value is the second trigger offset value, and the second value is the first preset threshold; and
the first value is the second trigger offset value, and the second value is the second preset threshold;
where both the first offset value and the second offset value are determined based on a delay required for beam switching.

Optionally, in a case that the first parameter information includes QCL information, the first target RS is a semi-persistent RS, and the first target RS is corresponding to first information of a neighboring cell of the terminal, the processor 910 is configured to:
in a case that the first target RS is activated by using a first media access control MAC control element CE command, after a target effective time domain resource, determine that QCL information of the first target RS is valid QCL information, where the target effective time domain resource is a resource determined based on a reference effective time domain resource and a third offset value;
where the reference effective time domain resource is corresponding to a local cell of the terminal; and the third offset value is determined based on at least one of the following: a delay of sending the first MAC CE command to the terminal by a network-side device, a delay of sending acknowledgement information of the first MAC CE command to the network-side device by the terminal, a delay required for beam switching, or a delay of sending an RS to the terminal by the network-side device in the neighboring cell of the terminal.

Optionally, the radio frequency unit 901 is configured to perform at least one of the following:
stopping performing a sending or receiving operation of fourth information in a first time period;
performing a sending or receiving operation of fifth information in the first time period; or
performing rate matching on a physical downlink shared channel PDSCH in the first time period;
where the first time period is related to transmission time of a second target RS; the fourth information is a channel or an RS of a third object; the fifth information is a channel or an RS, in the channel or the RS of the third object, that has a QCL relationship with the second target RS; and the third object is a cell, a physical cell, a TRP, or a beam corresponding to a third target RS, the third target RS is one of the first RS and the second RS, and the second target RS is the other of the first RS and the second RS.

Optionally, the first time period includes:

first transmission time and first offset time, where the first transmission time is the transmission time of the second target RS, and the first offset time includes at least one of first sub-offset time or second sub-offset time;

where the first sub-offset time is located before the first transmission time, and is consecutive with the first transmission time; and the second sub-offset time is after the first transmission time, and is consecutive with the first transmission time.

Optionally, in a case that the second target RS is the second RS, the transmission time of the second target RS is determined based on at least one of the following:

timing information corresponding to the second RS; or timing information corresponding to the first RS.

Optionally, the radio frequency unit 901 is configured to perform at least one of the following:

stopping performing a measurement operation of sixth information in a second time period; or performing a measurement operation of seventh information in the second time period;

where the second time period is related to transmission time of a channel or an RS of a fourth object; the sixth information is a fifth target RS; the seventh information is an RS, in the fifth target RS, that has a QCL relationship with the channel or the RS of the fourth object; and the fourth object is a cell, a physical cell, a TRP, or a beam corresponding to a fourth target RS, the fourth target RS is one of the first RS and the second RS, and the fifth target RS is the other of the first RS and the second RS.

Optionally, the second time period includes:

second transmission time and second offset time, where the second transmission time is the transmission time of the channel or the RS of the fourth object, and the second offset time includes at least one of third sub-offset time or fourth sub-offset time;

where the third sub-offset time is before the second transmission time, and is consecutive with the second transmission time; and the fourth sub-offset time is after the second transmission time, and is consecutive with the second transmission time.

Optionally, the processor 910 is configured to:

measure the second RS during running of a first CSI processing unit according to the first parameter information corresponding to the first target RS;

where running duration of the first CSI processing unit is determined based on any one of the following:

first $(Z_1, Z_1')$, where the first $(Z_1, Z_1')$ is any $(Z_1, Z_1')$ of T $(Z_1, Z_1')$ with a largest value in Q candidate $(Z_1, Z_1')$; and second $(Z_1, Z_1')$, where the second $(Z_1, Z_1')$ is determined based on third $(Z_1, Z_1')$ and a fourth offset value, and the third $(Z_1, Z_1')$ is any $(Z_1, Z_1')$ of Q candidate $(Z_1, Z_1')$;

where T and Q are positive integers, and the fourth offset value is determined based on a delay required for beam switching.

Optionally, the radio frequency unit 901 is configured to:

receive configuration information, where the configuration information is used to indicate the terminal to measure and report a layer-1 signal to interference plus noise ratio L1-SINR, the configuration information is configured with the first information corresponding to the first RS and the second RS, and the first information corresponding to the first RS and the second RS is different.

Optionally, the processor 910 is configured to:

measure the first RS according to the first parameter information corresponding to the first RS.

It should be noted that in this embodiment, the terminal 900 may implement processes in the method embodiment in FIG. 3 in the embodiment of the present disclosure, and achieve a same beneficial effect. To avoid repetition, details are not described herein again.

Specifically, an embodiment of this disclosure further provides a network-side device. As shown in FIG. 8, the network side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes information that needs to be sent, and sends processed information to the radio frequency apparatus 82. The radio frequency apparatus 82 processes the received information, and sends processed information by using the antenna 81.

The frequency band processing apparatus may be located in the baseband apparatus 83, and the method performed by the network-side device in the foregoing embodiment may be implemented in the baseband apparatus 83. The baseband apparatus 83 includes a processor 84 and a memory 85.

The baseband apparatus 83 may include, for example, at least one baseband board, where a plurality of chips are disposed on the baseband board. As shown in FIG. 8, one chip is, for example, the processor 84, which is connected to the memory 85, so as to schedule a program in the memory 85 to perform an operation of the network side device shown in the foregoing method embodiment.

The baseband apparatus 83 may further include a network interface 86, configured to exchange information with the radio frequency apparatus 82. For example, the interface is a common public radio interface (common public radio interface, CPRI for short).

Specifically, the network-side device in this embodiment of the present disclosure further includes instructions or a program stored in the memory 85 and capable of running on the processor 84. The processor 84 invokes the instructions or the program in the memory 85 to perform processes in the method embodiment in FIG. 5, and achieves a same technical effect. To avoid repetition, details are not described herein again.

This embodiment of this disclosure further provides a non-transitory readable storage medium, storing therein a program or an instruction, where the program or instruction, when executed by a processor, implements various processes of the method embodiment in FIG. 3 or FIG. 5, and may implement the same technical effects, which will not be described in detail herein again to avoid repetition.

The processor is a processor in the terminal described in the foregoing embodiment. The non-transitory readable storage medium includes a non-transitory computer-readable storage medium, for example, a Read-Only Memory (ROM), a Random Access Memory (RAM), a magnetic disk, an optical disc, or the like.

This embodiment of this disclosure further provides a chip, including a processor and a communication interface, where the communication interface is coupled to the processor. The processor is configured to run a program or an instruction on a network-side device to implement various processes of the method embodiment in FIG. 3 or FIG. 5, and may implement the same technical effects, which will not be described in detail herein again to avoid repetition.

It should be understood that, the chip mentioned in this embodiment of this disclosure may further be referred to as a system-level chip, a system chip, a chip system, a system on chip, or the like.

It is to be noted that the terms "include", "comprise", or any other variation thereof in this specification intends to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this disclosure is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this disclosure essentially, or the part contributing to the prior art, may be presented in the form of a software product. The computer software product is stored in a non-transitory storage medium (for example, a ROM/RAM, a magnetic disk, or an optical disc) including several instructions to enable a terminal (which may be a mobile phone, a computer, a server, an air conditioner, a network side device, or the like) to perform the methods described in the embodiments of this disclosure.

Although the embodiments of this disclosure have been described above with reference to the accompanying drawings, this disclosure is not limited to the specific implementations described above, and the specific implementations described above are merely exemplary and not limitative. A person of ordinary skill in the art may make various variations under the teaching of this disclosure without departing from the spirit of this disclosure and the protection scope of the claims, and such variations shall all fall within the protection scope of this disclosure.

What is claimed is:

1. A measurement method, performed by a terminal and comprising:
obtaining first parameter information corresponding to a first target reference signal (RS), wherein the first target RS comprises at least one of a first RS or a second RS, the first RS is used for channel measurement, the second RS is used for interference measurement, the first RS is associated with the second RS, and the first RS and the second RS are corresponding to different first information; and
measuring the second RS according to the first parameter information corresponding to the first target RS;
wherein the first parameter information comprises timing information, the first parameter information corresponding to the first target RS comprises any one of the following:
timing information associated with a first object, wherein the first object is an object in which the first target RS is located;
timing information associated with first information corresponding to the first target RS; or
timing information associated with a second object, wherein the second object is an object associated with the first information corresponding to the first target RS;
wherein the object is a cell, a physical cell, a transmitting receiving point (TRP), or a beam.

2. The method according to claim 1, wherein the first parameter information further comprises quasi co-location (QCL) information; and
the QCL information comprises at least one of first-type QCL information or second-type QCL information, the first-type QCL information is beam information, and the second-type QCL information comprises at least one of time domain information or frequency domain information.

3. The method according to claim 1, wherein that the first RS and the second RS are corresponding to different first information comprises:
target information associated with the first RS and the second RS is corresponding to different first information; and
the target information comprises at least one of following: QCL information; resource setting information; second information of resource setting information; or a source RS of QCL information;
wherein the second information is timing information or a parameter indicating timing information.

4. The method according to claim 1, wherein the first information comprises at least one of following: cell identity information, physical cell identifier (PCI) information, transmitting receiving point (TRP) identity information, frequency information, subcarrier spacing (SCS) information, numerology information, timing advance (TA) information, or QCL information.

5. The method according to claim 1, wherein the measuring the second RS according to the first parameter information corresponding to the first target RS comprises:
obtaining second parameter information, wherein the second parameter information is determined based on the first parameter information corresponding to the first target RS; and
measuring the second RS according to the second parameter information.

6. The method according to claim 1, wherein the first target RS comprises the second RS, the obtaining the first parameter information corresponding to the first target reference signal RS comprises any one of following:
determining, according to the first parameter information corresponding to the first RS or the first RS, first parameter information corresponding to the second RS; and
in a case that a first condition is met, determining, according to the first RS, the first parameter information corresponding to the second RS.

7. The method according to claim 6, wherein the first parameter information further comprises QCL information, that the first condition is met comprises that QCL information corresponding to the first RS is not default QCL information.

8. The method according to claim 6, wherein the determining, according to the first RS, the first parameter information corresponding to the second RS comprises:
  determining timing information corresponding to the first RS as timing information corresponding to the second RS; or
  the first parameter information further comprises QCL information, the determining, according to the first RS, the first parameter information corresponding to the second RS comprises at least one of following:
    in a case that the first RS is a synchronization signal/physical broadcast channel block (SSB), determining the first RS or a first tracking reference signal (TRS) as QCL information corresponding to the second RS, wherein the first TRS is a TRS corresponding to the first RS; or
    in a case that the first RS is a non-zero power (NZP) channel state information reference signal (CSI-RS), determining QCL information corresponding to the first RS as QCL information corresponding to the second RS.

9. The method according to claim 1, wherein in the first parameter information further comprises QCL information, the first target RS is an aperiodic RS, and the first target RS corresponds to first information of a neighboring cell of the terminal, the obtaining first parameter information corresponding to the first RS comprises:
  in a case that the first target RS is triggered by using first downlink control information (DCI), determining, according to a target trigger offset value and a target preset threshold, QCL information corresponding to the first target RS;
  wherein the target trigger offset value is a first trigger offset value or a second trigger offset value, the first trigger offset value is corresponding to a local cell of the terminal, and the second trigger offset value is corresponding to the neighboring cell of the terminal; and the target preset threshold is a first preset threshold or a second preset threshold, the first preset threshold is corresponding to the local cell of the terminal, and the second preset threshold is corresponding to the neighboring cell of the terminal.

10. The method according to claim 9, wherein the determining, according to the target trigger offset value and the target preset threshold, the QCL information corresponding to the first target RS comprises at least one of following:
  in a case that a first value is less than a second value, the QCL information corresponding to the first target RS is default QCL information; or
  in a case that a first value is greater than or equal to a second value, the QCL information corresponding to the first target RS is QCL information indicated by the first DCI; wherein
  the first value and the second value meet any one of following:
    that the first value is a sum of the first trigger offset value and a first offset value, and the second value is the first preset threshold;
    that the first value is the first trigger offset value, and the second value is a sum of the first preset threshold and a second offset value;
    that the first value is the first trigger offset value, and the second value is the second preset threshold;
    that the first value is the second trigger offset value, and the second value is the first preset threshold; and
    that the first value is the second trigger offset value, and the second value is the second preset threshold;
  wherein both the first offset value and the second offset value are determined based on a delay required for beam switching.

11. The method according to claim 1, wherein the first parameter information further comprises QCL information, the first target RS is a semi-persistent RS, and the first target RS corresponds to first information of a neighboring cell of the terminal, the obtaining the first parameter information corresponding to the first target reference signal RS comprises:
  in a case that the first target RS is activated by using a first media access control (MAC) control element (CE) command, after a target effective time domain resource, determining that QCL information of the first target RS is valid QCL information, wherein the target effective time domain resource is a resource determined based on a reference effective time domain resource and a third offset value;
  wherein the reference effective time domain resource is corresponding to a local cell of the terminal; and the third offset value is determined based on at least one of following: a delay of sending the first MAC CE command to the terminal by a network-side device, a delay of sending acknowledgement information of the first MAC CE command to the network-side device by the terminal, a delay required for beam switching, or a delay of sending an RS to the terminal by the network-side device in the neighboring cell of the terminal.

12. The method according to claim 1, wherein the method further comprises at least one of following:
  stopping performing a sending or receiving operation of fourth information in a first time period;
  performing a sending or receiving operation of fifth information in the first time period; or
  performing rate matching on a physical downlink shared channel (PDSCH) in the first time period;
  wherein the first time period is related to transmission time of a second target RS; the fourth information is a channel or an RS of a third object; the fifth information is a channel or an RS, in the channel or the RS of the third object, that has a QCL relationship with the second target RS; and the third object is a cell, a physical cell, a TRP, or a beam corresponding to a third target RS, the third target RS is one of the first RS and the second RS, and the second target RS is another of the first RS and the second RS.

13. The method according to claim 1, wherein the method further comprises at least one of following:
  stopping performing a measurement operation of sixth information in a second time period; or
  performing a measurement operation of seventh information in the second time period;
  wherein the second time period is related to transmission time of a channel or an RS of a fourth object; the sixth information is a fifth target RS; the seventh information is an RS, in the fifth target RS, that has a QCL relationship with the channel or the RS of the fourth object; and the fourth object is a cell, a physical cell, a TRP, or a beam corresponding to a fourth target RS, the fourth target RS is one of the first RS and the second RS, and the fifth target RS is another of the first RS and the second RS.

14. The method according to claim 13, wherein the second time period comprises:
  second transmission time and second offset time, wherein the second transmission time is the transmission time of the channel or the RS of the fourth object, and the second offset time comprises at least one of third sub-offset time or fourth sub-offset time;
  wherein the third sub-offset time is before the second transmission time, and is consecutive with the second transmission time; and the fourth sub-offset time is after the second transmission time, and is consecutive with the second transmission time.

15. The method according to claim 1, wherein the measuring the second RS according to the first parameter information corresponding to the first target RS comprises:
  measuring the second RS during running of a first CSI processing unit according to the first parameter information corresponding to the first target RS;
  wherein running duration of the first CSI processing unit is determined based on any one of following:
    first $(Z_1, Z_1')$, wherein the first $(Z_1, Z_1')$ is any $(Z_1, Z_1')$ of T $(Z_1, Z_1')$ with a largest value in Q candidate $(Z_1, Z_1')$; and
    second $(Z_1, Z_1')$, wherein the second $(Z_1, Z_1')$ is determined based on third $(Z_1, Z_1')$ and a fourth offset value, and the third $(Z_1, Z_1')$ is any $(Z_1, Z_1')$ of Q candidate $(Z_1, Z_1')$;
  wherein T and Q are positive integers, and the fourth offset value is determined based on a delay required for beam switching.

16. The method according to claim 1, wherein before the measuring the second RS according to the first parameter information corresponding to the first target RS, the method further comprises:
  receiving configuration information, wherein the configuration information is used to indicate the terminal to measure and report a layer-1 signal to interference plus noise ratio (L1-SINR), the configuration information is configured with first information corresponding to the first RS and the second RS, and first information corresponding to the first RS and the second RS is different.

17. The method according to claim 1, further comprising:
  measuring the first RS according to the first parameter information corresponding to the first RS.

18. A terminal, configured to perform:
  obtaining first parameter information corresponding to a first target reference signal (RS), wherein the first target RS comprises at least one of a first RS or a second RS, the first RS is used for channel measurement, the second RS is used for interference measurement, the first RS is associated with the second RS, and the first RS and the second RS are corresponding to different first information; and
  measuring the second RS according to the first parameter information corresponding to the first target RS;
  wherein the first parameter information comprises timing information, the first parameter information corresponding to the first target RS comprises any one of the following:
    timing information associated with a first object, wherein the first object is an object in which the first target RS is located;
    timing information associated with first information corresponding to the first target RS; or
    timing information associated with a second object, wherein the second object is an object associated with the first information corresponding to the first target RS;
  wherein the object is a cell, a physical cell, a transmitting receiving point (TRP), or a beam.

19. A network-side device, configured to perform:
  obtaining first parameter information corresponding to a first target reference signal (RS), wherein the first target RS comprises at least one of a first RS or a second RS, the first RS is used for channel measurement, the second RS is used for interference measurement, the first RS is associated with the second RS, and the first RS and the second RS are corresponding to different first information; and
  sending the second RS according to the first parameter information corresponding to the first target RS;
  wherein in a case that the first parameter information comprises timing information, the first parameter information corresponding to the first target RS comprises any one of the following:
    timing information associated with a first object, wherein the first object is an object in which the first target RS is located;
    timing information associated with first information corresponding to the first target RS; and
    timing information associated with a second object, wherein the second object is an object associated with the first information corresponding to the first target RS;
  wherein the object is a cell, a physical cell, a transmitting receiving point (TRP), or a bean.

* * * * *